United States Patent
Singh et al.

(10) Patent No.: US 9,747,365 B2
(45) Date of Patent: Aug. 29, 2017

(54) QUERY UNDERSTANDING PIPELINE

(71) Applicant: Quixey, Inc., Mountain View, CA (US)

(72) Inventors: Brahm Kiran Singh, Santa Clara, CA (US); Shawn Purcell, Palo Alto, CA (US)

(73) Assignee: Quixey, Inc., Mountain View, CA (US)

( * ) Notice: Subject to any disclaimer, the term of this patent is extended or adjusted under 35 U.S.C. 154(b) by 422 days.

(21) Appl. No.: 14/339,588

(22) Filed: Jul. 24, 2014

(65) Prior Publication Data

US 2015/0379013 A1   Dec. 31, 2015

Related U.S. Application Data

(60) Provisional application No. 62/019,238, filed on Jun. 30, 2014.

(51) Int. Cl.
G06F 17/30   (2006.01)

(52) U.S. Cl.
CPC .............................. G06F 17/30654 (2013.01)

(58) Field of Classification Search
CPC ......... G06F 17/30525; G06F 17/30864; G06F 17/30654
See application file for complete search history.

(56) References Cited

U.S. PATENT DOCUMENTS

| | | | |
|---|---|---|---|
| 5,418,948 A | 5/1995 | Turtle | |
| 2004/0088651 A1* | 5/2004 | McKnight | G06F 8/427 715/234 |
| 2007/0015119 A1* | 1/2007 | Atenasio | G01C 21/20 434/130 |
| 2009/0063440 A1 | 3/2009 | Chacon | |
| 2010/0076947 A1* | 3/2010 | Kurapat | G06F 17/30864 707/706 |
| 2010/0293179 A1* | 11/2010 | Chaudhuri | G06F 17/30864 707/759 |

(Continued)

FOREIGN PATENT DOCUMENTS

WO   WO-03003241 A1   1/2003

OTHER PUBLICATIONS

International Search Report and Written Opinion for related WO Application No. PCT/US2015/036040, dated Oct. 19, 2015.

*Primary Examiner* — Tarek Chbouki
(74) *Attorney, Agent, or Firm* — Harness, Dickey & Pierce, P.L.C.

(57) ABSTRACT

A method for performing a search includes receiving a search query having one or more query terms from a remote device and generating a collection of one or more analyzed tokens based on the search query. The analyzed token collection is indicative of at least a subset of the query term(s). The method includes inputting the analyzed token collection into different parsers that each parse the analyzed token collection and/or the search query according to a parsing operation specific to the parser and output a parsed query including a list of one or more parsed tokens. Each parsed token includes a string, and at least one parsed token of at least one of the parsed queries includes one or more properties of the string. The method further includes generating a retrieval query based on the parsed queries outputted by the parsers and generating search results based on the retrieval query.

22 Claims, 13 Drawing Sheets

(56) References Cited

U.S. PATENT DOCUMENTS

2011/0184893 A1* 7/2011 Paparizos ......... G06F 17/30525
  706/12
2011/0276580 A1 11/2011 Press et al.
2013/0346400 A1 12/2013 Ramsey et al.

* cited by examiner

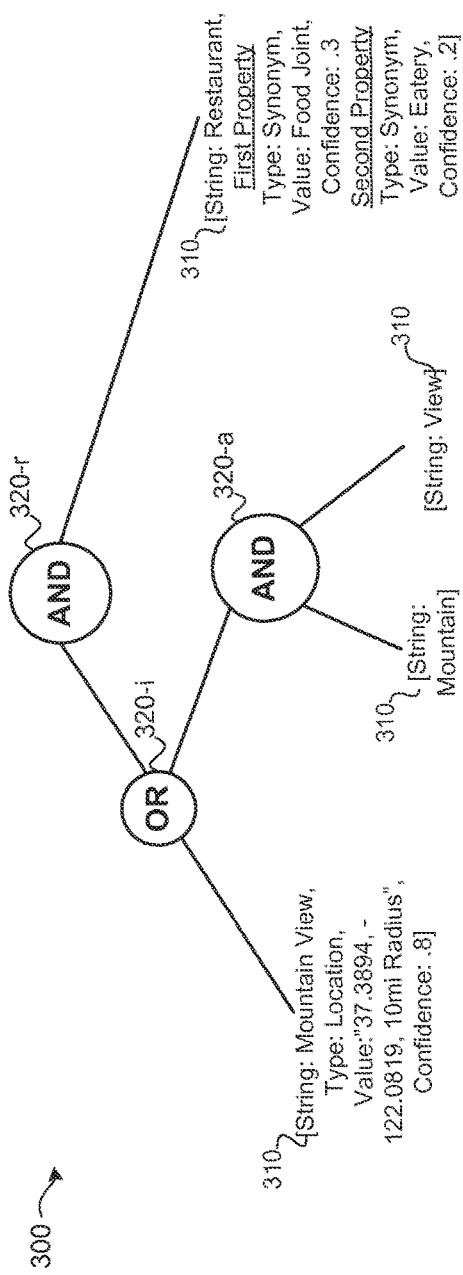
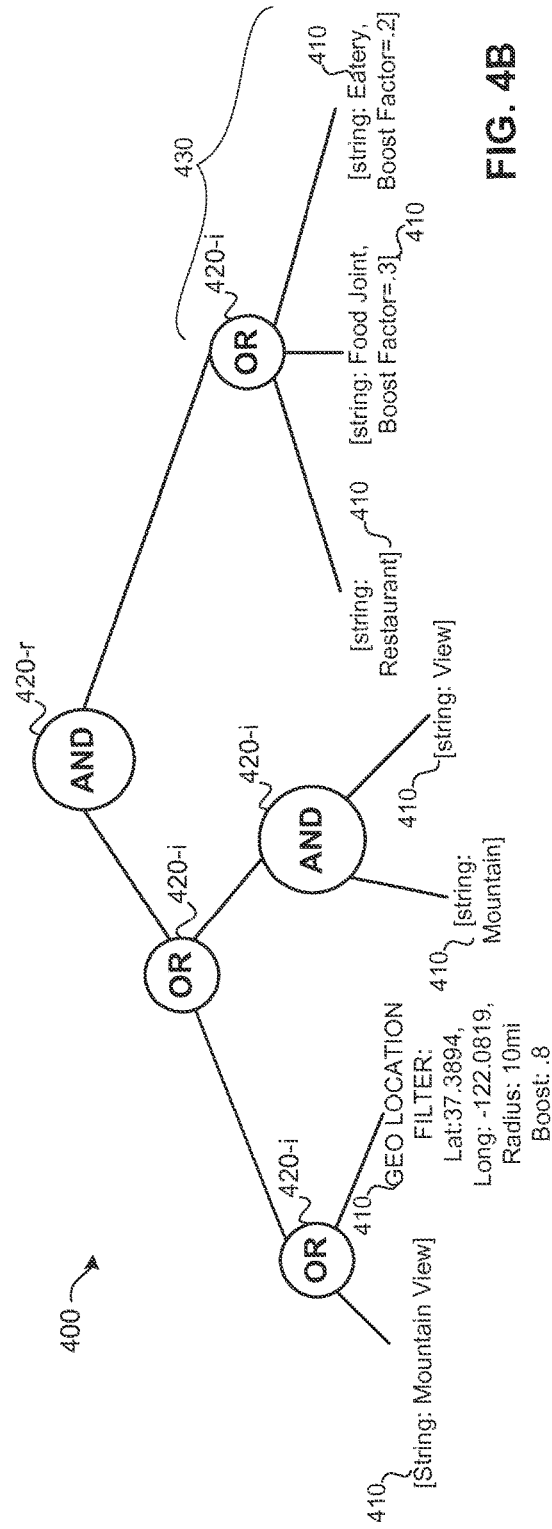
FIG. 3B
FIG. 4B

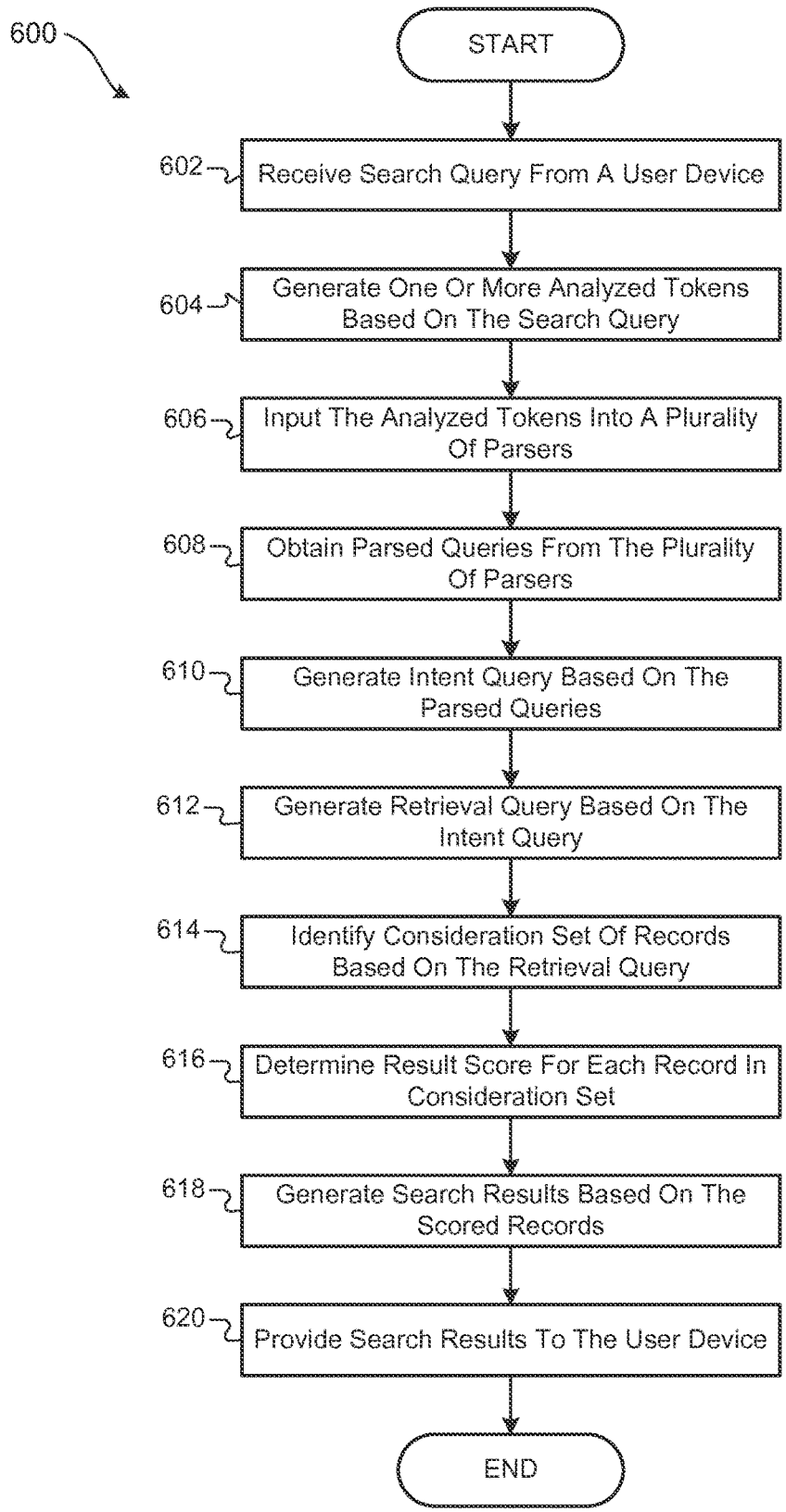

QUERY UNDERSTANDING PIPELINE

CROSS REFERENCE TO RELATED APPLICATIONS

This U.S. patent application claims priority under 35 U.S.C. §119(e) to U.S. Provisional Application 62/019,238, filed on Jun. 30, 2014, which is hereby incorporated by reference in its entirety.

TECHNICAL FIELD

This disclosure relates to a query understanding pipeline. In particular, this disclosure relates to a method and system for generating a retrieval query that is used to identify records in a search process.

BACKGROUND

Search engines can be utilized in many different fields. Search engines can be used to identify content on the World Wide Web (the "Web"), identify applications, or identify functionalities across the Web and a collection of applications. Central to any search process is the search query. A search query is a collection of one or more query terms that a search engine utilizes to identify relevant search results. Traditionally, a search engine treats a search query as a "bag of words," whereby the search engine attempts to find results that match to one or more of the terms in the "bag of words." This approach, however, does not take into account ambiguities that may exist in the search query itself or that there may have been better terms that would have produced more relevant results.

SUMMARY

One aspect of the disclosure provides a method for performing a search. The method includes receiving a search query from a remote device and generating a collection of one or more analyzed tokens based on the search query. The search query includes one or more query terms. The collection of the one or more analyzed tokens is indicative of at least a subset of the one or more query terms. The method further includes inputting the collection of one or more analyzed tokens into a plurality of different parsers. Each parser parses the collection of one or more analyzed tokens and/or the search query according to a parsing operation specific to the parser and outputs a parsed query that includes a list of one or more parsed tokens. Each parsed token includes a string and at least one parsed token of at least one of the parsed queries includes one or more properties of the string. The method further includes generating a retrieval query based on the parsed queries output by the plurality of different parsers. The retrieval query is a data structure indicative of the parsed queries. The method also includes generating search results based on the retrieval query and providing the search results to the remote device.

According to some implementations of the present disclosure at least one of the parsed tokens of at least one of the parsed queries includes a confidence value. The confidence value indicates a level of confidence of a property of the string determined by the parser that generated the parsed token.

According to some implementations of the present disclosure generating the retrieval query based on the parsed queries includes generating an intent query based on the parsed queries and generating the retrieval query based on the intent query. The intent query can be a tree data structure having a plurality of connected intent query nodes including one or more intent query leaf nodes. Each intent query leaf node stores a parsed token. The retrieval query is a tree data structure having a plurality of retrieval query nodes. The plurality of retrieval query nodes includes a plurality of retrieval query leaf nodes. Each retrieval query leaf node stores a string or a property of a string. In some implementations, generating the retrieval query based on the intent query includes generating a subtree of the retrieval query based on the intent query leaf node for each intent query leaf node and connecting the generated subtrees of the retrieval query using higher level intermediate nodes. The higher level intermediate nodes each store a logic operator. According to some implementations of the present disclosure, generating a subtree for an intent query leaf node includes determining whether the parsed token stored in the intent query leaf node include one or more properties in addition to the string of the parsed token. When the parsed token in the intent query leaf node includes one or more properties, the method includes creating a string retrieval query leaf node, storing the string of the parsed token in the string retrieval query node, and for each property in the parsed token stored in the intent query leaf node: i) creating a property retrieval query leaf node; (ii) storing the property of the parsed token in the property retrieval query leaf node; and (iii) connecting the string retrieval query node and each of the property retrieval query leaf nodes with an intermediate level node, the intermediate level node storing a logic operator. When the parsed token in the intent query leaf node does not include one or more properties, the method includes creating a string retrieval query leaf node and storing the string of the parsed token in the string retrieval query node.

According to some implementations of the present disclosure generating search results includes identifying, from a datastore that stores records, a consideration set of records based on attributes stored in the record and one or more of the string retrieval query leaf nodes or the property retrieval query leaf nodes. Further, for each of the records in the consideration set, generating the search results includes determining a result score of the records based on at least a subset of the attributes and features of the search query, and selecting one or more of the records for inclusion in the search results based on the respective result scores of the records in the consideration set. The search results are generated based on the selected records. In some implementations, the records are application state records. In these implementations, each application state record corresponds to a functionality or state of an application and stores attributes of the functionality or state, and one or more access mechanisms to access the functionality or the state of the application. In some of these implementations, the method further includes generating a scoring query based on the intent query and the search query. The scoring query is a nested data structure and the result scores of each record in the consideration set are further based on the scoring query.

According to some implementations of the present disclosure the plurality of parsers include a location parser that outputs location parsed tokens and a synonym parser that outputs synonym parsed tokens. The location-based parsed tokens can include a string identifying a known geographic location and one or more properties of the string. Each property can include geographic coordinates corresponding to the geographic location and a confidence value that indicates a degree of likelihood that the analyzed tokens input to the location parser are describing the known geographic location. The synonym parsed tokens can include a string defining one or more strings defined in the analyzed tokens and one or more properties. The one or more properties can define a synonym of the string and a confidence value that indicates a degree of likelihood that the synonym is an acceptable substitute for the string.

In another aspect of the disclosure a search engine is disclosed. The search engine includes a storage device that stores a datastore and a processing device. The datastore stores a plurality of records. The processing device executes computer readable instructions. The computer readable instructions, when executed by the processing device, cause the processing device to receive a search query including one or more query terms from a remote device and to generate a collection of one or more analyzed tokens based on the search query. The collection of the one or more analyzed tokens is indicative of at least as subset of the one or more query terms. The instructions further cause the processing device to input the collection of one or more analyzed tokens into a plurality of different parsers. Each parser parses the collection of one or more analyzed tokens and/or the search query according to a parsing operation specific to the parser and outputs a parsed query that includes a list of one or more parsed tokens. Each parsed token includes a string and at least one parsed token of at least one of the parsed queries includes one or more properties of the string. The instructions further cause the processing device to generate a retrieval query based on the parsed queries output by the plurality of different parsers, to generate search results based on the retrieval query and the plurality of records, and to provide the search results to the remote device. The retrieval query is a data structure indicative of the parsed queries.

According to some implementations of the present disclosure at least one of the parsed tokens of at least one of the parsed queries includes a confidence value. The confidence value indicates a level of confidence of a property of the string determined by the parser that generated the parsed token.

According to some implementations of the present disclosure generating the retrieval query based on the parsed queries includes generating an intent query based on the parsed queries and generating the retrieval query based on the intent query. The intent query can be a tree data structure having a plurality of connected intent query nodes including one or more intent query leaf nodes. Each intent query leaf node stores a parsed token. The retrieval query is a tree data structure having a plurality of retrieval query nodes. The plurality of retrieval query nodes includes a plurality of retrieval query leaf nodes. Each retrieval query leaf node stores a string or a property of a string. In some implementations, generating the retrieval query based on the intent query includes generating a subtree of the retrieval query based on the intent query leaf node for each intent query leaf node and connecting the generated subtrees of the retrieval query using higher level intermediate nodes. The higher level intermediate nodes each store a logic operator.

According to some implementations of the present disclosure, generating a subtree for an intent query leaf node includes determining whether the parsed token stored in the intent query leaf node include one or more properties in addition to the string of the parsed token. When the parsed token in the intent query leaf node includes one or more properties, the method includes creating a string retrieval query leaf node, storing the string of the parsed token in the string retrieval query leaf node, and for each property in the parsed token stored in the intent query leaf node: i) creating a property retrieval query leaf node; (ii) storing the property of the parsed token in the property retrieval query leaf node; and (iii) connecting the string retrieval query node and each of the property retrieval query leaf nodes with an intermediate level node, the intermediate level node storing a logic operator. When the parsed token in the intent query leaf node does not include one or more properties, the method includes creating a string retrieval query leaf node and storing the string of the parsed token in the string retrieval query node.

According to some implementations of the present disclosure generating search results includes identifying a consideration set of records from the datastore based on attributes stored in the record and one or more of the string retrieval query leaf nodes or the property retrieval query leaf nodes. Further, for each of the records in the consideration set, generating the search results includes determining a result score of the records based on at least a subset of the attributes and features of the search query, and selecting one or more of the records for inclusion in the search results based on the respective result scores of the records in the consideration set. The search results are generated based on the selected records. In some implementations, the records are application state records. In these implementations, each application state record corresponds to a functionality or state of an application and stores attributes of the functionality or state, and one or more access mechanisms to access the functionality or the state of the application. In some of these implementations, the instructions further cause the processing device to generate a scoring query based on the intent query and the search query. The scoring query is a nested data structure and the result scores of each record in the consideration set are further based on the scoring query.

According to some implementations of the present disclosure the plurality of parsers include a location parser that outputs location parsed tokens and a synonym parser that outputs synonym parsed tokens. The location-based parsed tokens can include a string identifying a known geographic location and one or more properties of the string. Each property can include geographic coordinates corresponding to the geographic location and a confidence value that indicates a degree of likelihood that the analyzed tokens input to the location parser are describing the known geographic location. The synonym parsed tokens can include a string defining one or more strings defined in the analyzed tokens and one or more properties. The one or more properties can define a synonym of the string and a confidence value that indicates a degree of likelihood that the synonym is an acceptable substitute for the string. The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A and 3B are schematic views illustrating examples of intent queries.

FIGS. 4A and 4B are schematic views illustrating examples of retrieval queries.

FIG. 6 is a flow chart illustrating an example set of operations of a method for performing a search process.

Like reference symbols in the various drawings indicate like elements.

DETAILED DESCRIPTION

Figure 1A:
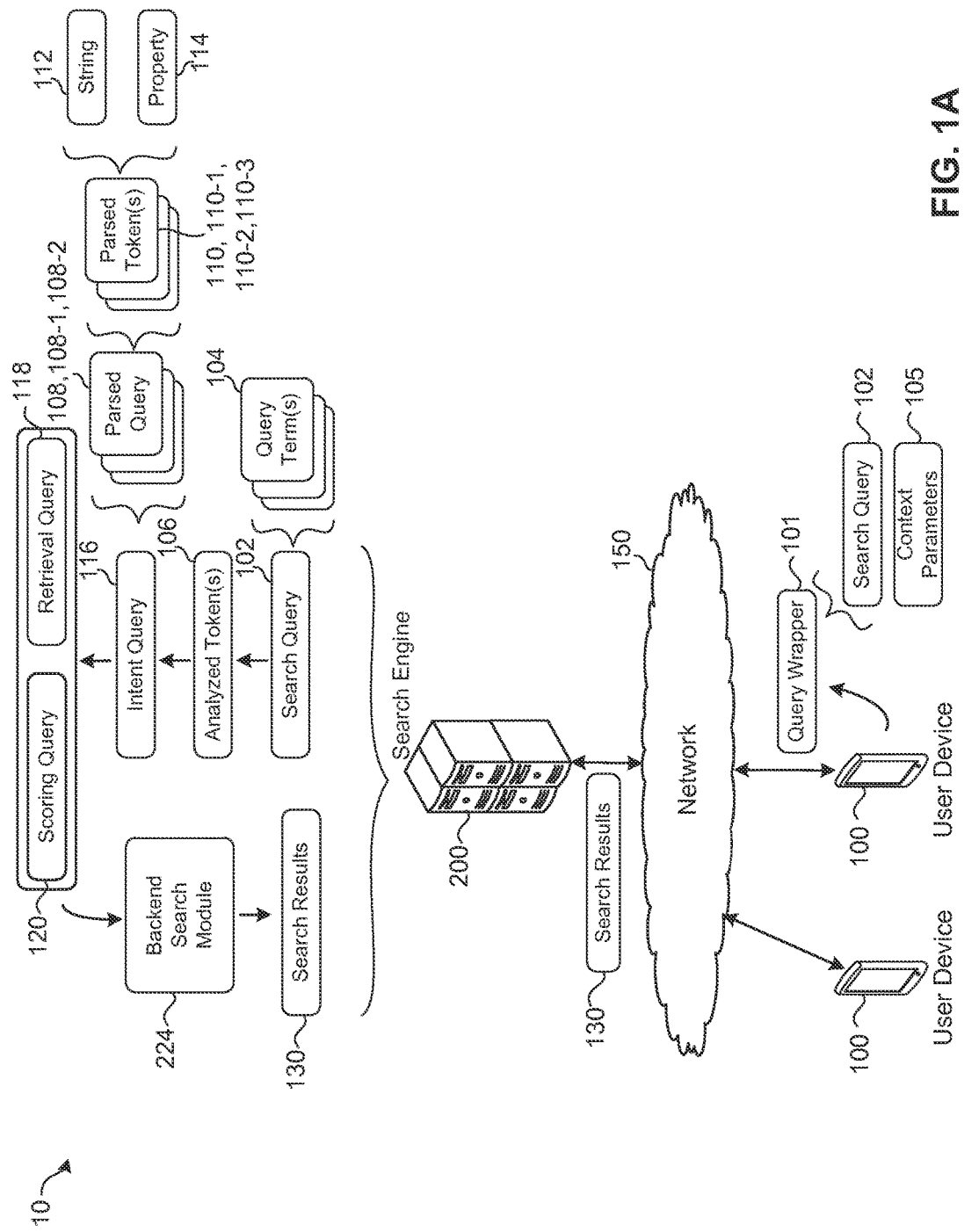
FIG. 1A is a schematic view illustrating an example environment of a search engine that receives search queries from user devices.

FIG. 1A illustrates an example environment 10 of a search engine 200. A search engine 200 is a collection of one or more computing devices that receives search queries 102 from user devices 100 via a network 150. While the user device 100 is depicted as a smartphone, a user device can be any suitable user computing device including, but not limited to, a tablet computing device, a personal computing device, a laptop computing device, a gaming device, a vehicle infotainment device, and/or a smart appliance (e.g., smart refrigerator or smart television). The search engine 200 generates search results 130 based on the search query 102 and provides the search results 130 to a requesting user device 100. The search engine 200 may perform any suitable type of searches. For example, the search engine 200 may perform web searches (e.g., for content found on websites), application searches (e.g., for applications having particular attributes), and/or application state searches (e.g., for specific states or functions of either native or web applications).

In operation, the search engine 200 is configured to receive the search query 102 and to perform a series of operations that enable the search engine 200 to better understand the intent of the search query 102. A search query 102 is a collection of one or more query terms 104, each query term 104 being made up of letters, numbers, and/or characters. For instance, an example search query 102 may be "mountain view restaurants." In this example, it is unclear whether the search query 102 is attempting to locate restaurants in the city "Mountain View" or is looking for restaurants that offer views of mountains. In some implementations, the user device 100 transmits the search query 102 in a query wrapper 101 that contains a search query 102 and one or more context parameters 105. A context parameter 105 can refer to any information that may be relevant in providing additional context to the search query 102. Examples of context parameters 105 include, but are not limited to, a geolocation of the user device 100, a username of a user of the user device 100, an operating system of the user device 100, and/or a list of applications installed on or accessed by the user device 100. The search engine 200 processes the search query 102, and in some implementations, the context parameters 105 and generates a retrieval query 118, which is input into a backend search system 224. In particular, the search engine 200 performs multiple different parsing operations on the search query 102 (or a representation of the search query 102) to identify different possible interpretations of the search query 102. These different interpretations are transformed into the retrieval query and input into the backend search system 224.

The backend search system 224 is a component of the search engine that determines the search results 130. The backend search system 224 utilizes the retrieval query 118 to identify a more relevant consideration set. A retrieval query 118 can refer to an expanded version of the search query 102 that is input to a backend search system 224. The retrieval query 118 is formatted in accordance with the syntax requirements of the backend search system 224. A consideration set of records can refer to a collection of records identified by the backend search system 224 that have at least some relevance to the retrieval query 118. Furthermore, instead of actual records a consideration set of records may contain record identifiers of the records or pointers to where the records may be retrieved from memory. In the case of an application state search, the records in the consideration set identify application states or functions that are at least somewhat relevant to the retrieval query 118. The backend search system 224 can then determine result scores for the records in the consideration set based on attributes defined in the records, attributes of the search query, and/or attributes of the records in the consideration set in view of the search query 102. Additionally or alternatively, the search engine 200 may generate a scoring query 120 that may be used to generate the result scores. A result score is a value that indicates a degree of relevance of the record to the search query 102. The search engine 200 can generate the search results 130 based on the records identified in the consideration set and the result scores thereof.

In some implementations, the search engine 200 initially analyzes and parses the search query 102 to identify one or more analyzed tokens 106. An analyzed token 106 can refer to a string of letters, numbers, and/or characters that represents one of the query terms 104. The search engine 200 then inputs the analyzed tokens 106 and in some implementations, the original search query 102 into a collection of different parsers 218 (FIGS. 2D-2H). Each parser can perform a different parsing function, and therefore, can perform a different parsing operation. For example, a first parser may perform "location-based parsing," a second parser can perform "synonym-based parsing," a third parser can perform "category-based parsing," etc. Drawing from this example, "location-based parsing" can refer to parsing the analyzed tokens 106, context parameters 105, and/or the search query 102 to identify any location names that may be in the search query 102. "Synonym-based parsing" can refer to parsing the analyzed tokens 106 and/or the search query 102 to identify synonyms of one or more of the query terms 104 contained in the search query 102 and represented by the analyzed tokens 106. "Category-based parsing" can refer to parsing the analyzed tokens 106 and/or the search query 102 to identify categories and/or subcategories of query terms contained in the search query 102. The foregoing are only examples of different types of parsers and parsing that the search engine 200 may perform to parse the analyzed tokens 106 and/or the search query 102. In operation, the search engine 200 may utilize any number of parsers 218. The parsers 218 can be modular components that may be added to the search engine 200 according to the specific objectives of the search engine 200. Each parser 218 outputs one or more parsed queries 108. A parsed query 108 is a collection of one or more parsed tokens 110 that are derived by a parser 218 based on the analyzed tokens 106. A parsed token 110 can include a string 112 and, in some scenarios, one or more properties 114 associated to the string 112. A property 114 can include a property type that indicates a type of the property (e.g., a location, a synonym, a category, a restaurant), a property value that indicates a value of the property (e.g., "long: 42 degrees North; lat: 47 degrees East; radius: 10 mi" "eatery" or "Thai food"), and in some scenarios a confidence value indicating a degree of confidence determined by the parser in its identification of the value defined in the property.

The search engine 200 combines the parsed queries 108 output by the parsers 218 into an intent query 116. An intent query 116 is a nested data structure that contains the information represented in the parsed queries 108 output by the collection of parsers 218. In some implementations, the intent query 116 is a tree structure (FIGS. 3A, 3B), whereby the leaf nodes of the tree structure are parsed queries 108 and the higher level nodes are logical operators (e.g., ANDs, ORs, XORs, NOT). Additionally or alternatively, the search engine 200 can represent an intent query 116 with a nested parenthesis string.

In some implementations, the search engine 200 can rewrite the intent query 116 into a retrieval query 118 and, in some of these implementations, a scoring query 120. As previously indicated, the search engine 200 utilizes the retrieval query 118 to identify the consideration set and the scoring query 120 to score items identified in the consideration set. The search engine 200 can generate the search results 130 based on the scored consideration set.

In some implementations, the search results 130 include one or more result objects. A result object can include information that is relevant to a single result (e.g., a single application or a single state thereof). A result object can include one or more access mechanisms and link data such as textual information regarding the result (e.g., a snippet of text from an application being linked to and/or a description of the application being linked to), and/or visual data (e.g., an icon of an application or website, a screenshot of the application or website). A user device 100 receives and renders the result objects included in the search results 130 into a displayable format. The displayable search results can include one or more user selectable links. Each user selectable link includes one or more access mechanisms. An access mechanism may refer to a native application access mechanism (hereinafter "application access mechanism"), a web access mechanism, and/or an application download address. When a user selects a user selectable link, the user device 100 utilizes an access mechanism to access a recourse referenced by the access mechanism. For example, the user may select a user selectable link including an access mechanism in order to access functionality of an application indicated in the user selectable link.

An application access mechanism may be a string that includes a reference to a native application (e.g., one of native applications) and indicates one or more operations for the user device 100 to perform. If a user selects a user selectable link including an application access mechanism, the user device 100 may launch the native application referenced in the application access mechanism and perform the one or more operations indicated in the application access mechanism.

A web access mechanism may include a resource identifier that includes a reference to a web resource (e.g., a page of a web application/website). For example, a web access mechanism may include a uniform resource locator (URL) (i.e., a web address) used with hypertext transfer protocol (HTTP). If a user selects a user selectable link including a web access mechanism, the user device 100 may launch the web browser application and retrieve the web resource indicated in the resource identifier. Put another way, if a user selects a user selectable link including a web access mechanism, the user device 100 may launch the web browser application and access a state (e.g., a page) of a web application/website. In some examples, web access mechanisms may include URLs for mobile-optimized sites and/or full sites.

An application download address may indicate a location (e.g., a digital distribution platform) where a native application can be downloaded in the scenario where the native application is not installed on the user device 100. If a user selects a user selectable link including an application download address, the user device 100 may access a digital distribution platform from which the referenced native application may be downloaded. The user device 100 may access a digital distribution platform using at least one of the web browser application and/or a native application.

Figure 1B:
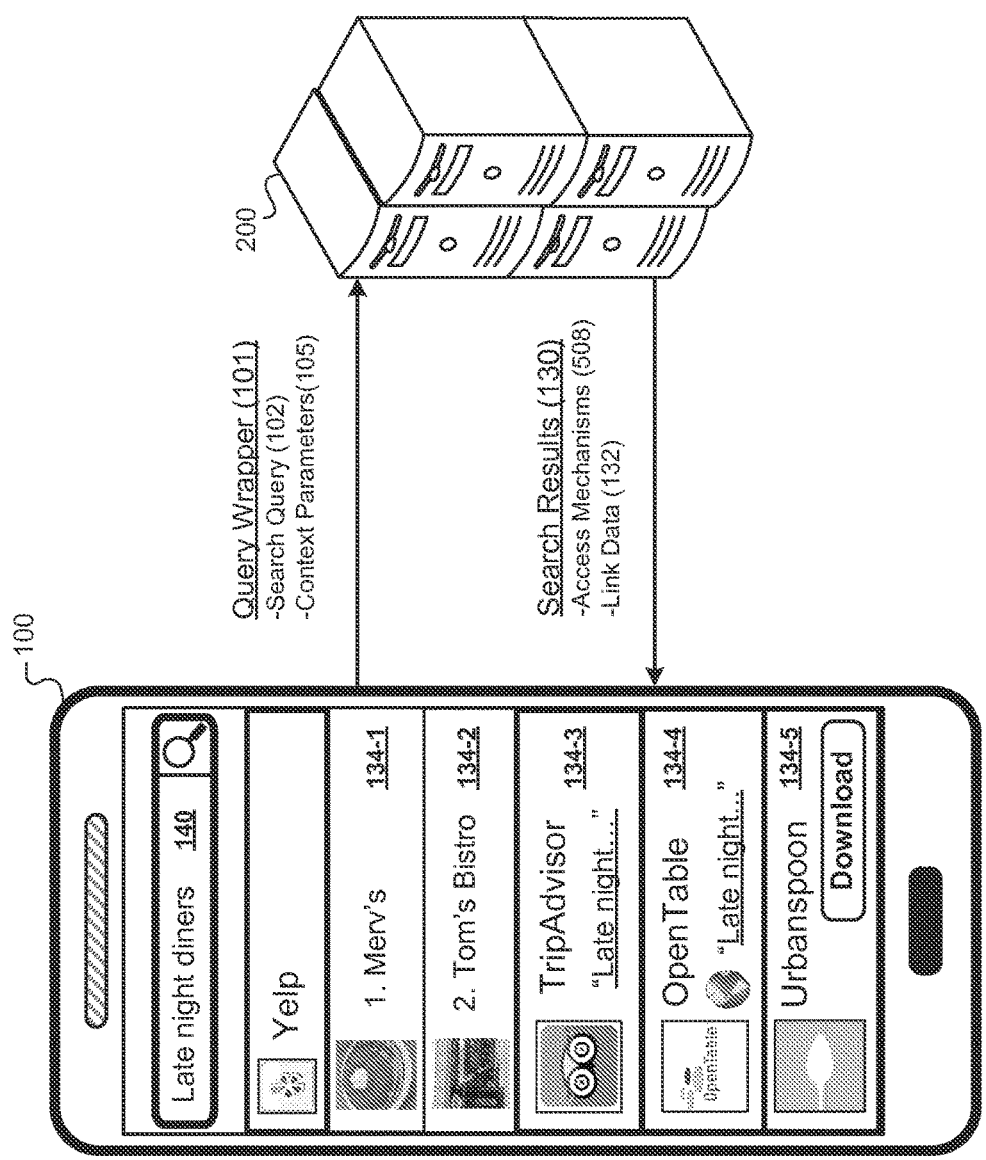
FIG. 1B is a schematic view illustrating an example user device displaying search results received from a search engine.

FIG. 1B illustrates an example of a user device 100 displaying user selectable links 134 that are included in search results 130 provided to the user device 100. In the illustrated example, the search results 130 are in response to a search query 102 "late night diners," which a user has entered in a search box 140. The user device receives the search results 130 and renders the user selectable links 134 based on the search results 130. Each of the links 134 include link data 132. For example, each of the links 134 includes an image (e.g., an icon) and text (e.g., an application or business name) that may describe an application and a state of an application. Each of the links 134 may include an access mechanism 508 (FIG. 5) so that if a user selects one of links 134, the user device 100 launches the application and sets the application into a state that is specified by the access mechanism 508 associated with the selected link 134. For example, the user may select link 134-2 to launch the YELP native application by Yelp, Inc. to an entry for "Tom's Bistro." In another example, the user may select link 134-2 to access the OPENTABLE web application at a state specified by an underlying web access mechanism (e.g., to a state showing search results for "late night diners"). In a third example, the user may select link 134-5 to have the user device 100 access a digital distribution platform, whereby the user can download the URBANSPOON native application to the user device 100. In some implementations, the user device 100 may arrange the links 134 based on result scores associated with the access mechanisms 508 included in the links 134. In some implementations, as illustrated in FIG. 1B, links 134 for the same application may be combined together in the search results 130 displayed to the user.

FIGS. 2A-2H illustrate example implementations of a search engine 200. In the illustrated examples, the search engine 200 includes a processing device 210, a storage device 240, and a network interface device 270. The processing device 210 executes a search module 212. The storage device 240 stores a datastore 242. In some implementations, the datastore 242 stores state records 500, which the search module 212 utilizes to identify and generate the search results 130 indicative of states or functions of applications that are relevant to a search query 102.

The processing device 210 can include memory (e.g., RAM and/or ROM) that stores computer executable instructions and one or more processors that execute the computer executable instructions. In implementations of two or more processors, the processors can operate in an individual or distributed manner. In these implementations, the processors can be arranged in a single computing device or across multiple computing devices (e.g., rack-mounted servers).

The network interface device 270 includes one or more devices that can perform wired or wireless (e.g., Wi-Fi or cellular) communication. Examples of the network interface device 270 include, but are not limited to, a transceiver configured to perform communications using the IEEE 802.11 wireless standard, an Ethernet port, a wireless transmitter, and a universal serial bus (USB) port.

The storage device 240 can include one or more computer readable storage mediums (e.g., hard disk drives and/or flash memory drives). The storage mediums can be located at the same physical location or at different physical locations (e.g., different servers and/or different data centers). The storage device 240 can store a datastore 242.

In the illustrated implementation, the search module 212 is configured to perform application state searches. Put another way, the search module 212 is configured to identify states or functions within applications that are relevant to the search query 102. For instance, in response to a search query for "thai restaurants," the search module 212 may identify states or functions within a crowd sourced review application (e.g., the YELP application), whereby the states or functions are entries for restaurants that serve Thai cuisine, and states or functions within a restaurant reservation application (e.g., the OPENTABLE application by OpenTable, Inc.), whereby the states or functions are entries that allow users to make reservations for enlisted restaurants that serve Thai cuisine. The foregoing is an example of an application state. Other states of different types of applications are equally applicable to the disclosure.

Figure 2A:
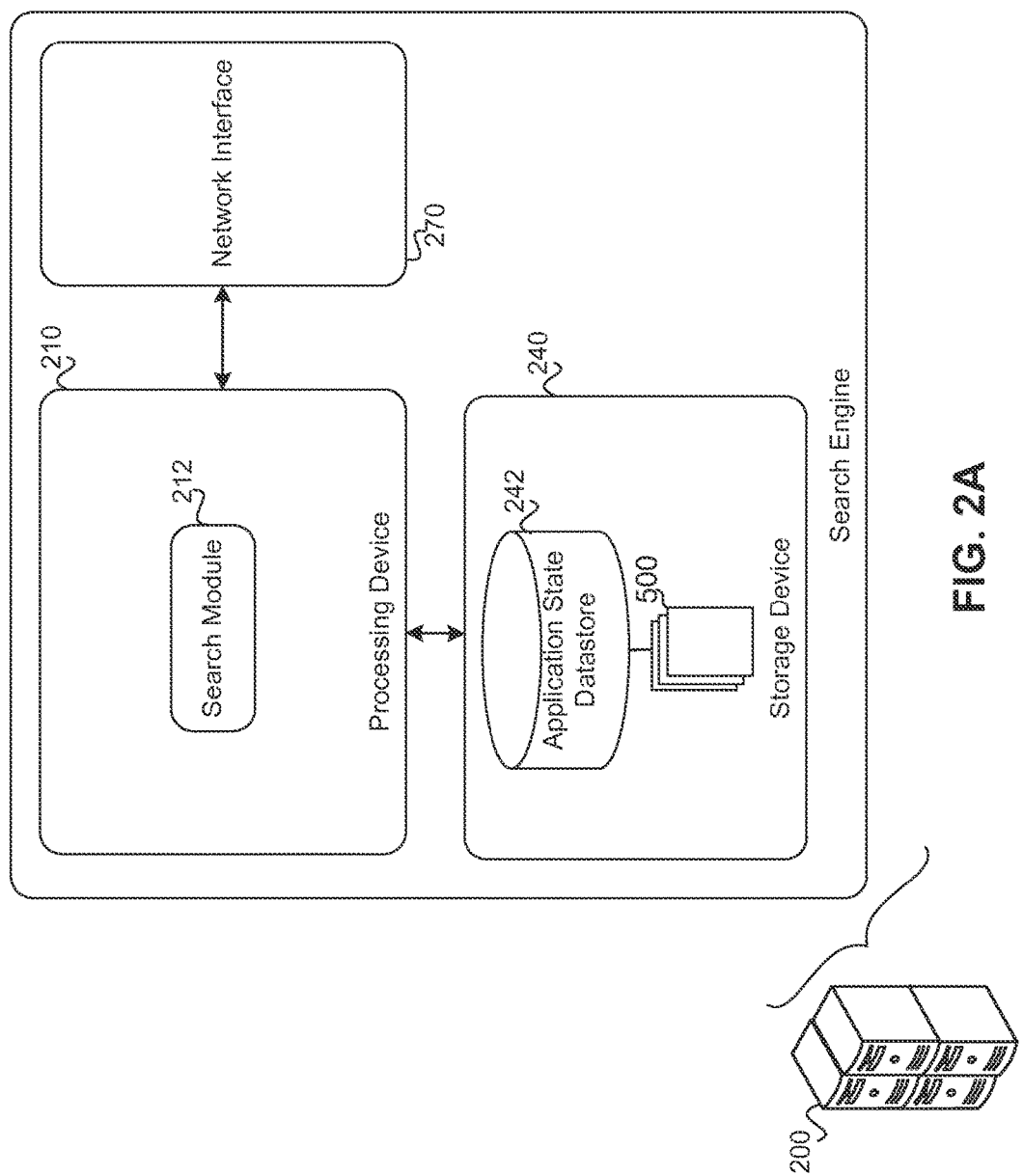
FIG. 2A is a schematic view illustrating example components of a search engine.
Figure 2B:
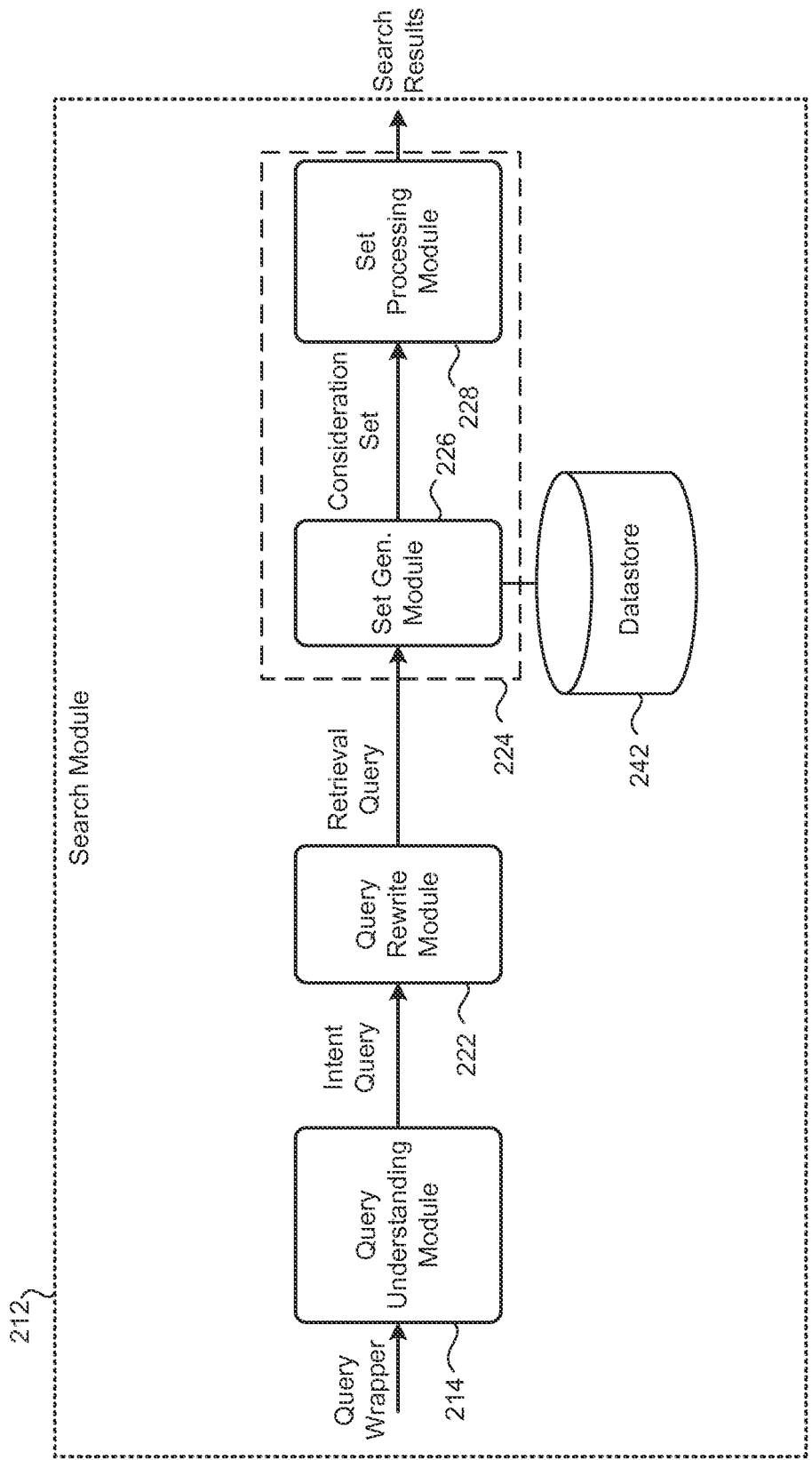
FIGS. 2B and 2C are schematic views illustrating example components of a search module.
Figure 2C:
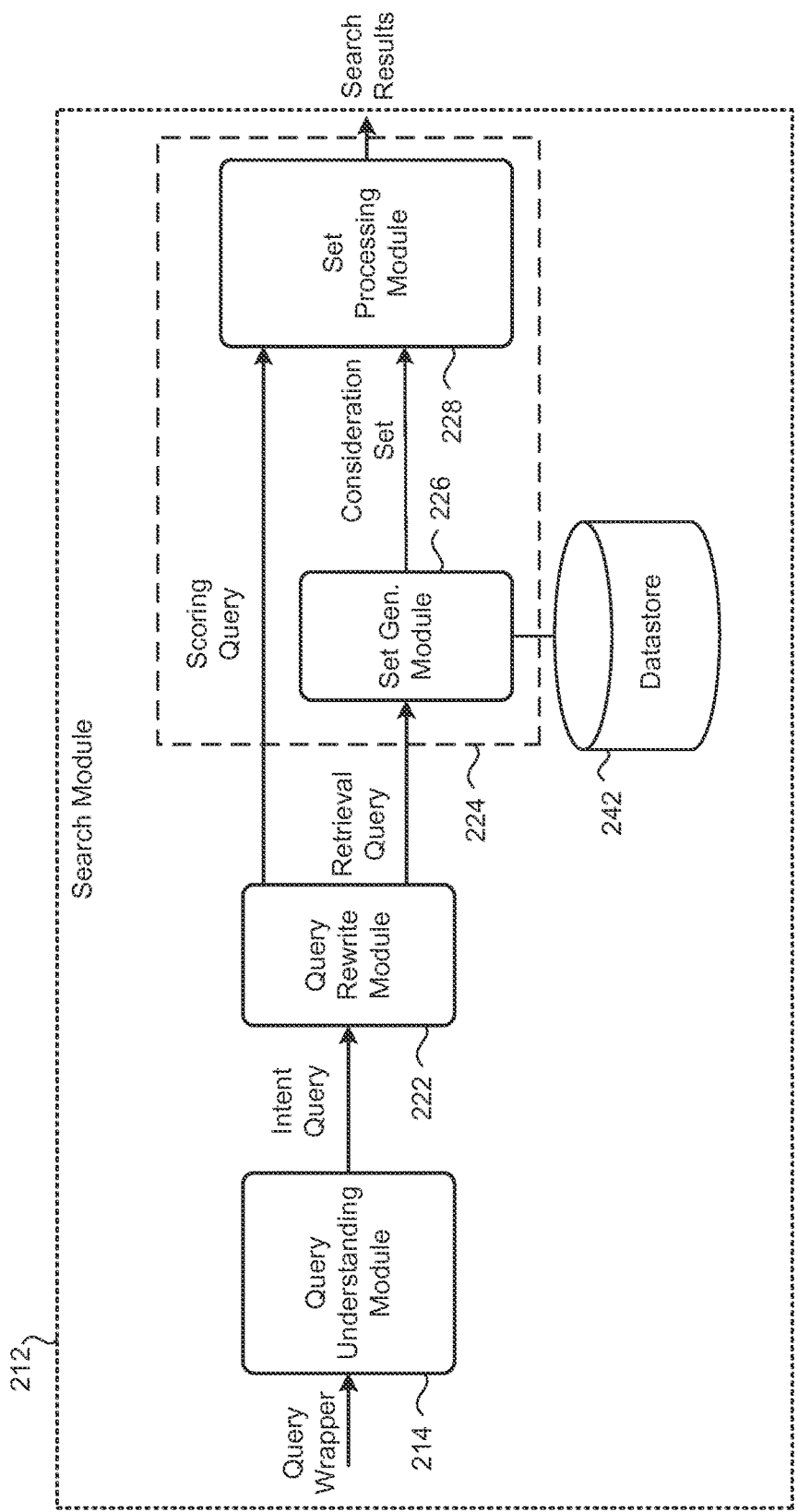

FIGS. 2B and 2C illustrate example implementations of the search module 212. In the illustrated implementations, the search module 212 includes a query understanding module 214, a query rewrite module 222, and a search backend 224 that can include a set generation module 226 and a set processing module 228.

The query understanding module 214 receives a search query 102 sent from a user device 100 and outputs an intent query 116 to the query rewrite module 216. The query understanding module 214 bases the intent query 116 on the search query 102. In some implementations, the query understanding module 214 further bases the intent query 116 on one or more of the context parameters 105.

Figure 2D:
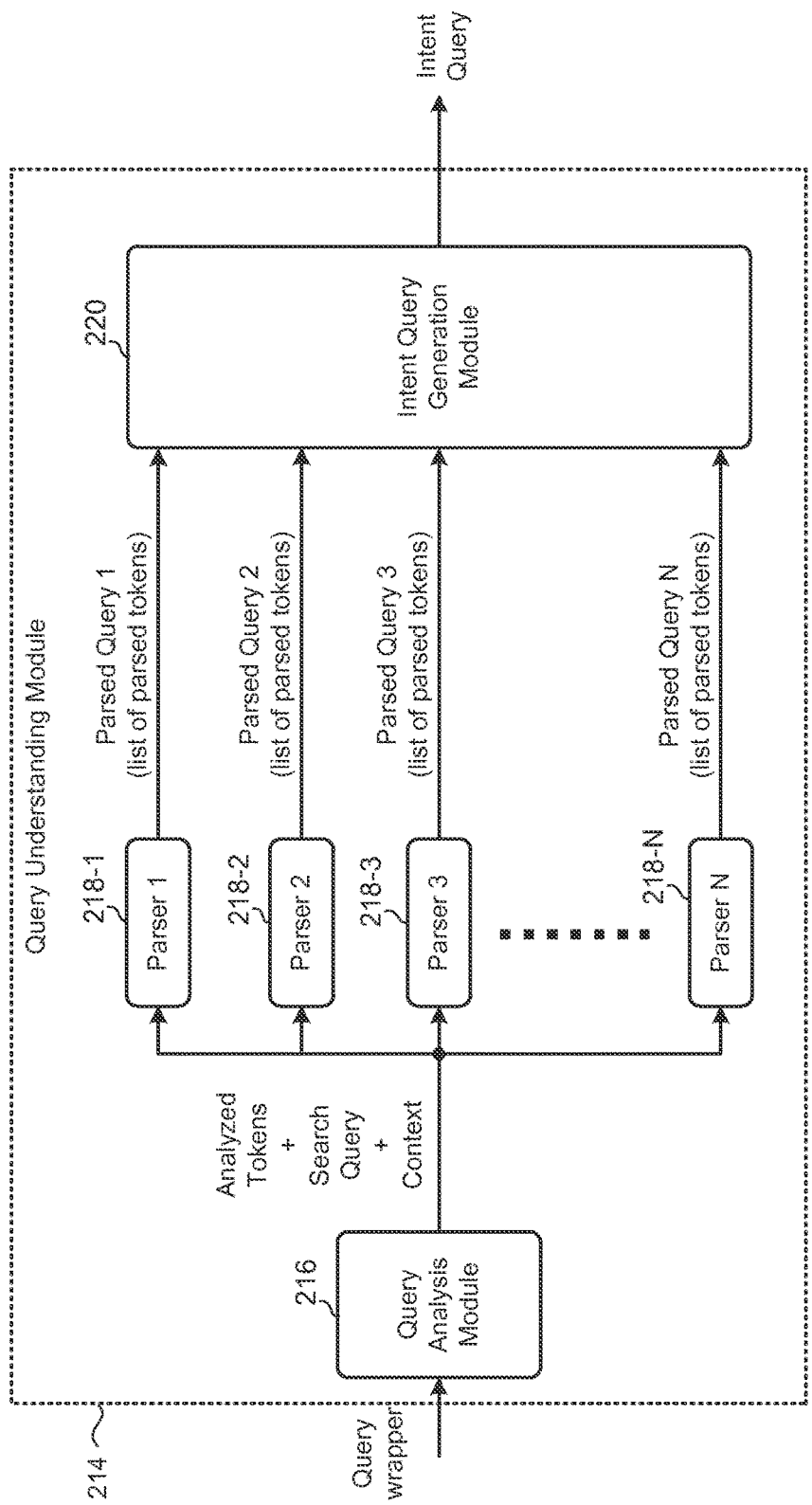
FIG. 2D is a schematic view illustrating example components of a query understanding module.

FIG. 2D illustrates the query understanding module 214 according to some implementations of the present disclosure. In the illustrated example, the query understanding module 214 includes a query analysis module 216, N different parsers 218 (e.g., 218-1, 218-2, 218-3 . . . 218-N), and an intent query generation module 220.

In the illustrated example, the query analysis module 216 receives the query wrapper 101, analyzes the search query 102 and/or the context parameters 105 contained in the query wrapper 101, and outputs one or more analyzed tokens 106 based on the search query 102 and/or the context parameters 105. The query analysis module 216 deconstructs the query wrapper 101 to extract the search query 102 and the context parameters 105. The query analysis module 216 can then perform an analysis of the query terms 104 of the search query to identify the analyzed tokens. For instance, the query analysis module 216 determines whether any of the query terms 104 is a stop word, and if so, removes the stop word from the query terms 104. Stop words are a predetermined set of words that are deemed to be less significant than other words. Examples of common stop words are "a," "an," "the," "of," "for," "is," "at," "which," and "that." The list of stop words can include other words not explicitly listed above. Additionally or alternatively, the query analysis module 216 can stem the query terms 104.

The query analysis module 216 stems a query term 104 to its base form. The query analysis module 216 can perform any suitable stemming algorithms, such as lookup algorithms and/or suffix-stripping algorithms.

The query analysis module 216 can generate the analyzed tokens 106 based on the query terms 104 after removing stop words and stemming the query terms 104. An analyzed token is a string that represents the query term 104. In some implementations, the query analysis module 216 utilizes a lookup table to tokenize each of the query terms 104 into a corresponding analyzed token 106. Analyzed tokens can be represented by numbers, symbols, and/or letters.

The query analysis module 216 inputs the analyzed tokens 106 into the N different parsers 218. In some implementations, the query analysis module 216 also inputs the original search query 102 and/or the context parameters 105 into the N parsers 218 with the analyzed tokens 106. Each parser 218 is configured to perform a different parsing operation on the inputted information and to output one or more parsed queries 108. Each parsed query 108 output by a parser 218 represents a possible interpretation of the search query 102 (or a portion thereof) by the parser 218 according to the parsing operation that was performed. A parsed query 108 includes one or more parsed tokens 110. A parsed token 110 represents a portion of the search query 102, as interpreted by the corresponding parser 218. For instance, a first parser 218 may receive two analyzed tokens 106 and identify a first parsed token 110 corresponding to a first analyzed token 106 and a second parsed token 110 corresponding to a second analyzed token 106. A different parser 218, however, may receive the same two analyzed tokens 106 and may identify a single parsed token 110 that corresponds to the first and second analyzed tokens 106 (e.g., [mountain] and [view]-> [mountain view]). Further, in some scenarios a parser 218 may determine more than one parsed token 110 that corresponds to the analyzed token 106. In such a scenario, the parser 218 may output more than one parsed queries 108, whereby each parsed query 108 corresponds to a different one of the more than one parsed tokens 110 output by the parser 218. A parsed token 110 can include a string 112 and, in some situations, one or more properties 114 of the string 112. The properties of a string 112 can include a property type, a property value, and a confidence score. The confidence score indicates a degree of confidence that the parser 112 has the assignment of the property 114 to the string 112.

Figure 2E:
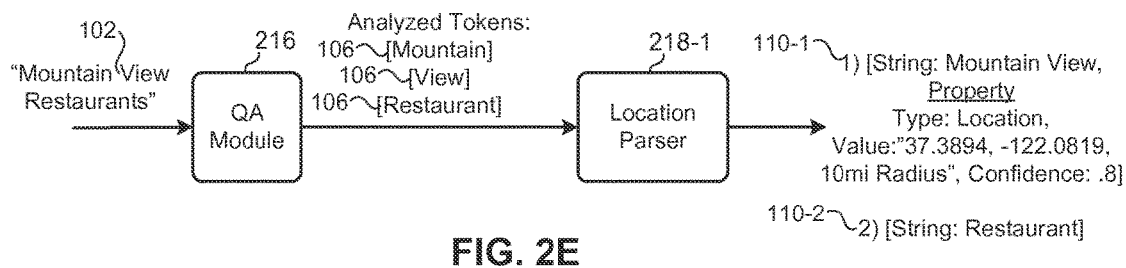
FIGS. 2E-2G are schematic views illustrating different examples of parsers.
Figure 2F:
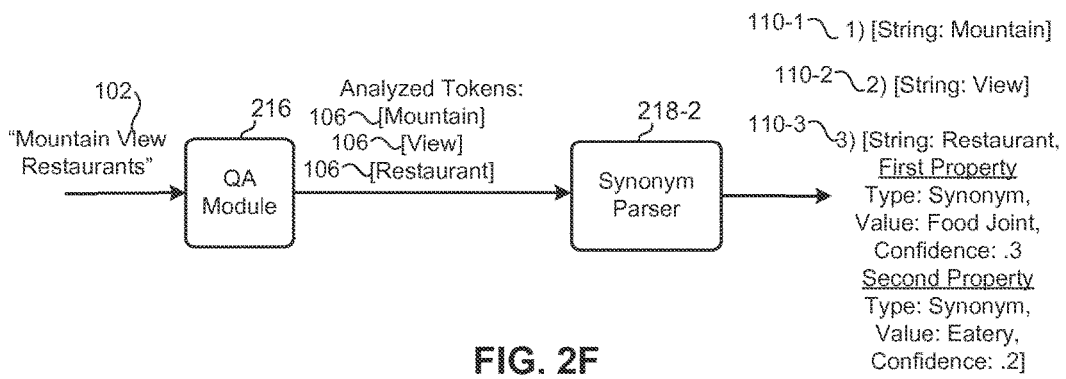
Figure 2G:
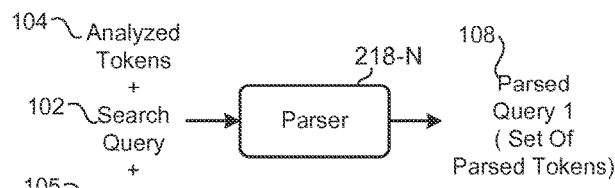

FIGS. 2E-2G illustrate examples parsing operations being performed by a parser 218. In FIG. 2E, a location parser 218-1 performs a location based parsing operation on analyzed tokens 106 corresponding to [mountain], [view], and [restaurant], which may have been the determined from a search query 102 containing the "mountain view restaurants" or "restaurants in mountain view." In some implementations the location parser 218-1 references a location lookup table. The location lookup table lists the names of known locations and additional data of each known location. The additional data can include the geographic coordinates of the known location, a radius of known location, a popularity value of the known location, and a confidence score attributed to the known location. The popularity value can be indicative of the popularity of a location. For instance, if the location is heavily populated (e.g., New York, N.Y.) or a popular tourist destination (e.g., Traverse City, Mich.) the popularity value may be relatively high (e.g., 0.8 or 0.9 on a scale of zero to one). The confidence score may be a value indicating the likelihood that the known location is listed in a random search query 102. In some implementations, the confidence value is equal to the popularity value. In other implementations, the parser 218-1 can calculate the confidence value. For example, the confidence value may be based on the popularity value and/or a distance between the user device 100 and the geographic location. The location parser 218-1 can utilize the location lookup table to lookup individual terms (e.g., "mountain" or "view") or combinations of terms (e.g. "mountain view").

The location parser 218-1 parses the analyzed tokens 106 and outputs a parsed query 108 that includes two parsed tokens 110-1 and 110-2. In the illustrated example, the location parser 218-1 associates one property in the first parsed token 110-1 to a first string, and does not associate another property to the second string of the second token 110-2. In particular, the location parser 218-1 associates the property: [type: location, value: "37.3784, −122.0819, 10 MI Radius," confidence: 0.8] to a first string, [mountain view], based on its analysis of the analyzed tokens 106 [mountain], [view], and [restaurant]. In the example, the location parser 218-1 determines that the ordered combination of the terms "mountain" and "view" is very likely (e.g., 0.8 confidence) to correspond to the location value "37.3784, −122.081." In some implementations, the location parser 218-1 utilizes the additional data in the location lookup table to determine the confidence value. Also, as was discussed above, the query analysis module 216 may also input the original search query 102 and/or the context parameters 105 (e.g., geolocation of the user device) to the location parser 218-1. In a scenario, the confidence score may be influenced by such factors as a geolocation of the user device (e.g., whether the user device is proximate to the city Mountain View, Calif.) or the (likely removed) query term 104 "in" coming before the query terms "mountain view" (i.e., "in mountain view"). Furthermore, if the location parser 218-1 had identified two possible locations, the location parser 218-1 would have output two parsed queries 108, whereby each parsed query 108 would have included an analyzed token 106 corresponding to a different location. Appendix A illustrates example pseudocode of an example location parser. The example algorithm shown in Appendix A can be modified in accordance with the considerations discussed within this disclosure without departing from the scope of the disclosure.

In FIG. 2F, a synonym parser 218-2 performs a synonym based parsing operation on analyzed tokens 106. The synonym parser 218-2 may utilize a synonym lookup table to identify possible synonyms of words or phrases represented by one or more of the analyzed tokens 106. The synonym lookup table may define a list of known words and for each word, the word's known synonyms. For each synonym of a known word, the lookup table may also include a confidence value associated with the word/synonym pair. In this way, the synonym parser 218-2 can lookup up a word or phrase in the synonym lookup table to identify if the word or phrase has any synonyms, and if so, the confidence value associated with the word or phrase/synonym pairing.

In the illustrated example, the synonym parser 218-2 parses analyzed tokens 106 corresponding to [mountain], [view], and [restaurant], which may have been the determined from a search query 102 containing the "mountain view restaurants" or "restaurants in mountain view." As mentioned, the analysis module 216 may also input the original search query 102 and/or the context parameters to the synonym parser 218. In the illustrated example, the analysis module 216 outputs a parsed query 108 that includes three parsed tokens 110-1, 110-2, 110-3, where the third parsed token 110-3 has two properties. In particular, the synonym parser 218 associates the string [RESAURUANT] with a first example property "type: synonym, value: food joint, confidence: 0.3" and a second example property "type: synonym, value: eatery, confidence. 0.2." In this example, the synonym parser 218-2 determines that the synonym "food joint" is a better synonym than the synonym "eatery" when applied to the term "restaurant." The foregoing example assumes that the synonym parser 218-2 did not identify any additional synonyms to the term "restaurant" and did not identify any synonyms for the terms "mountain" and "view." Appendix A illustrates example pseudocode of an example synonym parser 218-2. The example algorithm shown in Appendix A can be modified in accordance with the considerations discussed within this disclosure without departing from the scope of the disclosure.

FIG. 2G illustrates a general parser 218. The general parser 218 can be configured to execute any suitable parsing operation. The parser 218 can receive one or more analyzed tokens 106 and outputs one or more parsed queries 108, each parsed query 108 including one or more parsed tokens 110. The parser 218 determines the parsed tokens 110 based on the analyzed tokens 106. Further, some parsers 218 may receive the original search query 102 and/or the context parameters 105. These parsers 218 may utilize the original search query 102 and/or the context parameters 105 to determine one or more of the parsed tokens 110. Some general parsers 218 utilize a lookup table specific to the parsing operation to be performed by the general parser 218 to identify properties of an analyzed token 106 or combination of analyzed tokens 106. Appendix A illustrates example pseudocode defining example parsing operations that may be implemented by a general parser. For example, a parser 218 can be configured to perform location-based parsing, synonym-based parsing, category-based parsing such as cuisine-based parsing, restaurant-based parsing, media content-based parsing, application-based parsing, or sports-based parsing. The examples of Appendix A are not intended to limit the scope of the disclosure. For example, the general parser 218 can perform an application function parsing operation that parses the analyzed tokens 106 for terms that indicate functions of applications. For example, if the analyzed tokens 106 include a term such as "deals," the parser can identify applications that provide users with coupons or deals. In such an implementation, the parser 218 can utilize a lookup table that associates specific terms to different applications and a confidence value. In another example, the general parser 218 can perform an open hours parsing operation that parses the analyzed tokens 106 for terms that indicate hours of operation. For example, if the analyzed tokens 106 include terms such as "open now," the general parser can identify a range of hours that correspond to the current time.

Figure 2H:
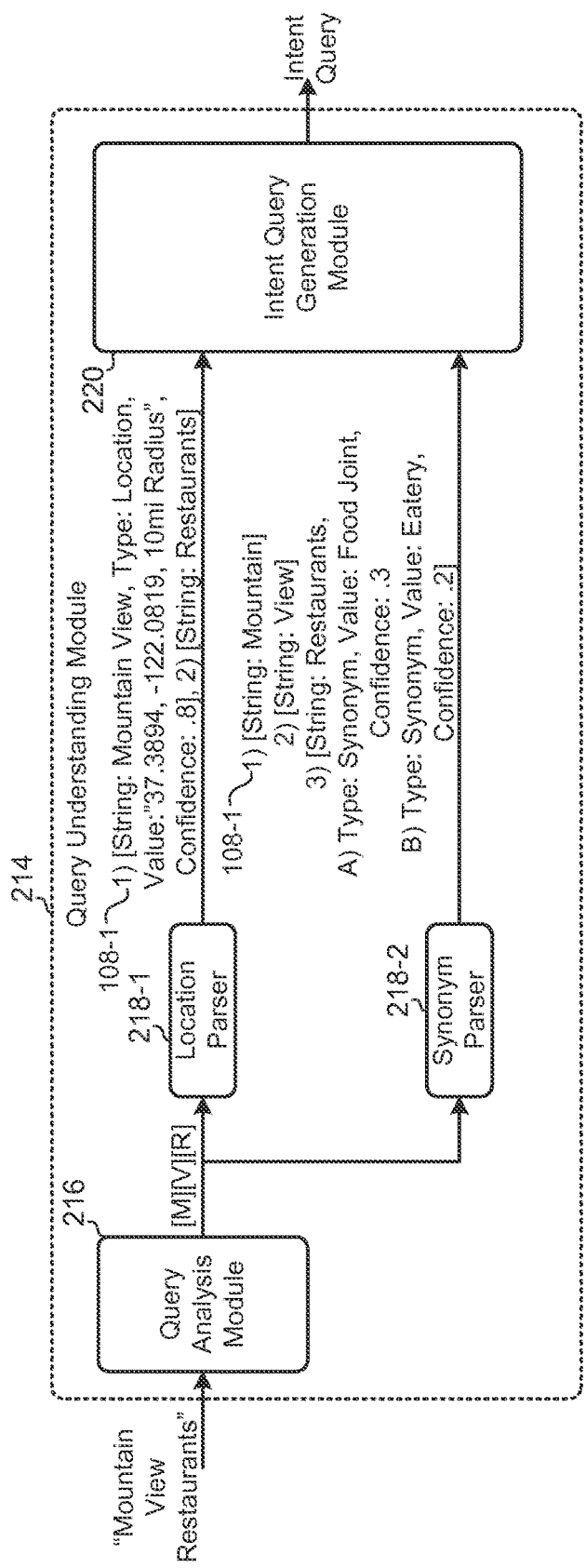
FIG. 2H is a schematic view illustrating an example of a query understanding module parsing a set of analyzed tokens.

FIG. 2H illustrates an example of the query understanding module 214 processing the example query 102 "mountain view restaurants." In the illustrated example, the query understanding module 214 includes a location parser 218-1 and a synonym parser 218-2. The query analysis module 216 identifies the analyzed tokens [mountain], [view], and [restaurant] and feeds the analyzed tokens 106 into the individual parsers 218-1, 218-2. The location parser 218-1 outputs a first parsed query 108-1 (as discussed with respect to FIG. 2E) and the synonym parser 218-2 outputs a second parsed query 108-2 (as discussed with respect to FIG. 2F). The parsed queries 108 are input into the intent query generation module 220, which generates an intent query 116 based on the two parsed queries 108-2.

Figure 3A:
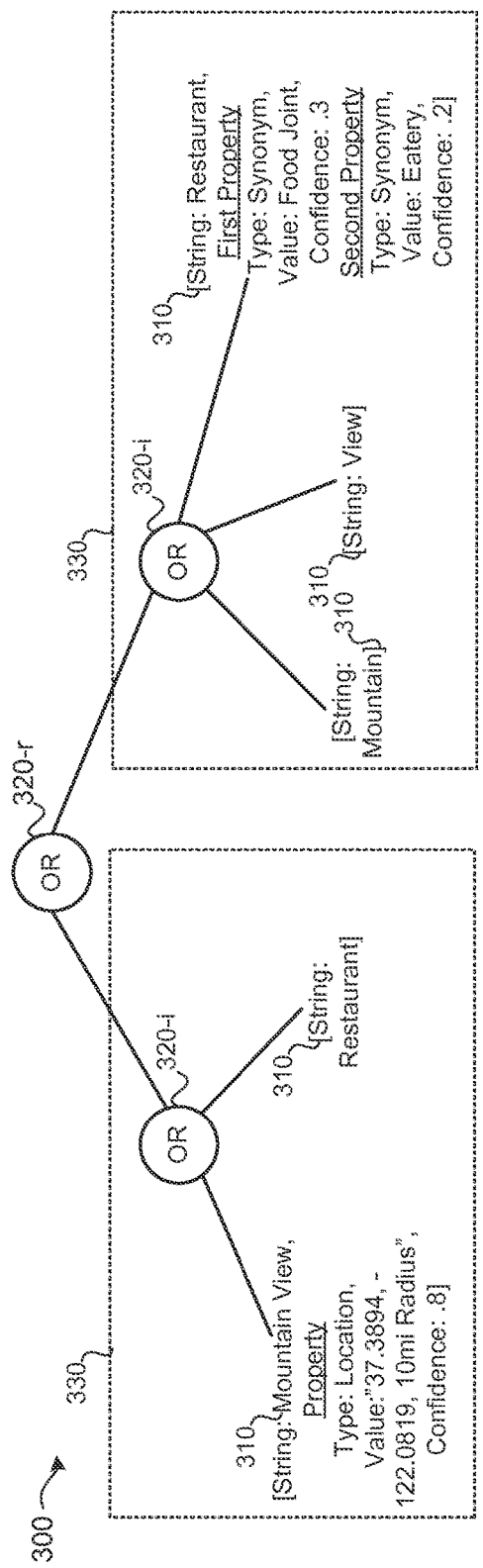

Example Location Parser Algorithm:
1. Read location lookup table //identifies all possible place names, their respective latitude and longitude, and popularity value, a popularity value may be indicative of a population or other metrics (e.g., small towns that have lots of tourists may have high popularity values despite a small population)
2. Receive Analyzed Tokens and geolocation context parameter
3. For each Combination Of Tokens {//Single Tokens and combinations of two or more tokens
4. If combination of tokens matches one or more locations names in the location lookup table
5. then: determine popularity of location from location lookup table
6. calculate distance to location based on user device geolocation context parameter and lookup table;
7. if popularity >=popularity threshold
   then: determine confidence value based on popularity // may be hard coded confidence values in lookup table that define confidence values that are based on popularity, e.g., New York may have higher confidence values than a small town or township.
8. if distance <=distance threshold
9. then: calculate confidence value based on distance // e.g., confidence value=(distance threshold−distance)/distance threshold
10. if popularity <popularity threshold AND distance >distance threshold
11. then assign default confidence value //e.g. 0 or relatively small value 0.1
12. generate parsed token based on combination of analyzed tokens and the greatest confidence value and assign a geo location property, with more details about the detected location
13. else: if number of analyzed tokens in the combination of tokens=1 //no location found
14. then generate a parsed token based on the string of analyzed token and do not assign a confidence value
15. else discard combination of tokens
16. Combine parsed tokens into a parsed query
17. Output parsed query Example Synonym Parser:
1. Read synonym lookup table //synonym lookup table identifies a list of words or phrases, each word or phrase's known synonyms, and a confidence value associated with each word or phrase/synonym pair.
2. Receive Analyzed Tokens
3. For each Combination Of Tokens {//Single Tokens and combinations of two or more tokens
4. Lookup combination of tokens in lookup table for any possible for matches
5. If matches found
6. then: generate a parsed token using the combination of tokens as the string
7. For each synonym identified in synonym lookup table
8. Add a new property defining the synonym and associated confidence value listed in the synonym lookup table
9. else: if number of analyzed tokens in the combination of tokens==1 //no synonyms and single token
10. then: generate a parsed token using the combination of tokens as the string
11. else: discard combination of tokens
12. Combine parsed tokens into a parsed query
13. Output parsed query Example Cuisine Parser
1. Read cuisine lookup table //cuisine lookup table identifies a list of known cuisines (e.g., barbeque), cuisine identifier, and alternate names for the cuisine (e.g., BBQ, bar-b-cue, barbecue).
2. Receive Analyzed Tokens
3. For each Combination Of Tokens {//Single Tokens and combinations of two or more tokens
4. Lookup combination of tokens in lookup table for any possible matches
5. If matches found
6. then: generate a parsed token using the combination of tokens as the string
7. Add a new property defining the cuisine identifier and a default confidence value
8. If the cuisine has alternate names add the alternate names as synonym properties and associate another default confidence value
8. else: if number of analyzed tokens in the combination of tokens=1 //no synonyms and single token
9. then: generate a parsed token using the combination of tokens as the string
10. else: discard combination of tokens
11. Combine parsed tokens into a parsed query
12. Output parsed query Example Media Content Parser:
1. Read media content lookup table //media content lookup table identifies a list of known media contents (e.g., movie, song, album), each known media content's associated words or phrases and a confidence value associated with each media content/word or phrase pair.
2. Receive Analyzed Tokens
3. For each Combination Of Tokens {//Single Tokens and combinations of two or more tokens
4. Lookup combination of tokens in lookup table for any possible for matches to known media content
5. If matches found
6. then: generate a parsed token using the combination of tokens as the string
7. Add a new property defining the media content and the confidence value associated with the media content/word or phrase pair
8. else: if number of analyzed tokens in the combination of tokens 1==//no synonyms and single token
9. then: generate a parsed token using the combination of tokens as the string
10. else: discard combination of tokens
11. Combine parsed tokens into a parsed query
12. Output parsed query Example Application Name Parser:
1. Read application name lookup table //application name lookup table identifies a list of known applications, an application identifier of the application, each known application's associated words or phrases, and a confidence value associated with each application/word or phrase pair.
2. Receive Analyzed Tokens
3. For each Combination Of Tokens {//Single Tokens and combinations of two or more tokens
4. Lookup combination of tokens in lookup table for any possible for matches to known application
5. If matches found
6. then: generate a parsed token using the combination of tokens as the string 7. Add a new property defining the application ID and the confidence value associated with the application/word or phrase pair
8. else: if number of analyzed tokens in the combination of tokens==1 //no synonyms and single token
9. then: generate a parsed token using the combination of tokens as the string
10. else: discard combination of tokens
11. Combine parsed tokens into a parsed query
12. Output parsed query Referring back to FIG. 2D, the intent query generation module 220 receives parsed queries 108 from the N parsers 218 and outputs an intent query 116 based on the parsed queries 108. An intent query 116 is a nested data structure that contains the information represented in the parsed queries 108. FIGS. 3A and 3B illustrate examples of intent queries 116. In the illustrated examples, the intent query 116 is a tree structure 300, whereby the leaf nodes 310 of the tree structure 300 represent parsed tokens 110 of the parsed queries 108 and the higher level nodes 312 are logical operators (e.g., ANDs, ORs, XORs, NAND).

The intent query generation module 220 can generate the tree structure using predetermined logic rules. In the implementations that generate the intent queries 116 such as the intent query of FIG. 3A, the logic rules instruct the intent query generation module 220 to operate on each parsed query 108 individually. For each parsed query 108, the intent query generation module 220 creates a leaf node 310 for each parsed token 110 of the parsed query 108. The intent query generation module 108 connects the leaf nodes 310 corresponding to the parsed tokens 110 of the parsed query 108 with an OR node 320-$i$. The resultant subtree 330 of the tree structure 300 represents the parsed query 108. In some implementations, the rules instruct the intent query generation module 220 to connect the parsed query with an AND node (not shown) instead of the OR node 320 (e.g., the leaf node 310 containing the "mountain view" location property is connected to the leaf node 310 containing the string "restaurant" by an AND node). The rules further instruct the intent query generation module 220 to connect the subtrees 330 of the tree corresponding to the different parsed queries 108 with another OR node 320-$r$. In this way, the intent query 116 connects the potential interpretations of the query with an OR node 320-$r$.

In implementations that generate the intent queries 116 such as the intent query of FIG. 3B, the logic rules instruct the intent query generation module 220 to merge parsed tokens 110 before generating the intent query generation module 220. In these implementations, if the string in a parsed token 110 matches the strings of one or more other parsed tokens 110, the logic rules instruct the intent query generation module 220 to merge parsed tokens 110. Merging two or more parsed tokens 110 can include creating a single parsed token 110 with the matching string and including the properties from each of the two or more parsed tokens 110 in the properties of the single parsed token 110. For example, if a first parsed token 110 includes the string "XYZ" and has properties (A, B, and C) and a second parsed token 110 includes the string "XYZ" and has properties (C, D, and E), the resultant merged parsed token 110 would include the string "XYZ" and would have the properties (A, B, C, D, and E). As was the case with the logic rules used to generate the tree structure of FIG. 3A, the logic rules instruct the intent query generation module 220 to create leaf nodes 310 for each of the remaining parsed tokens 110. The logic rules instruct the intent query generation module 220 to identify alternate parsed tokens 108. An alternate parsed token is a parsed token 110 whose string is either made up by a combination of strings from two or more other parsed tokens 110 or a parsed token 110 whose string can be combined with one or more strings from other parsed tokens 110 to result in a string from an alternate parsed token 110. For instance, the parsed token 110 having the string "mountain view" is an alternate parsed token to the parsed tokens 110 containing the strings "mountain" and "view." In the case that two or more tokens make up another token, the rules instruct the intent query generation module 220 to connect the leafs 310 representing the two or more tokens with an AND node 320-$a$. The rules then instruct the intent query generation module 220 to connect the leaf nodes 310 of the alternate parsed tokens with an OR node 320-$i$ (e.g., "mountain view" OR "mountain" AND "view"). The rules then instruct the intent query generation module 220 to connect subtrees 330 of the tree structure with disjointed parsed tokens (i.e., parsed tokens that do not have common strings) with an AND node 320-$r$ (e.g., the "mountain view" subtree with the "restaurant" subtree. The logic rules defined above are provided for example only. Additional types of rules can be implemented in the intent query generation module 220.

Additionally or alternatively, the search engine 200 can represent the intent query 116 with a nested parenthesis string. In some implementations, the rules may instruct the intent query generation module 220 to generate a nested parenthesis string in accordance with the manner described above. In these implementations, the innermost parenthesis statements are analogous to the leaf nodes 310 of the intent query 116 and the higher level nodes 320 are replaced by logical operators. For example, the intent query 116 of FIG. 3A may be represented by the following nested parenthesis string: (([string: mountain view, property: type: location, value: 7.3894, −122.0819, 10 mi radius", confidence: 0.8] OR [string: restaurant]) OR ([string: mountain] OR [string: view] OR [string: restaurant, property: type: synonym, value: food joint, confidence: 0.3; property: type: string, value: eatery, confidence: 0.2]). The intent query 116 of FIG. 3B may be represented with the following parenthesis string: (([string: mountain view, property: type: location, value: 7.3894, −122.0819, 10 mi radius", confidence: 0.8] OR ([string: mountain] AND [string: view])) AND [string: restaurant, property: type: synonym, value: food joint, confidence: 0.3; property: type: string, value: eatery, confidence: 0.2]).

The query rewrite module 222 receives an intent query 116 and generates a retrieval query 118 based on the intent query 116. A retrieval query 118 is a query that is representative and potentially an expansion of the search query 102 and is formatted in accordance with the syntax requirements of the set generation module 226. The query rewrite module 222 inputs the retrieval query 118 into the set generation module 226, which uses the retrieval query 118 to identify a consideration set of records (e.g., application state records or identifiers of records). In some implementations (e.g., FIG. 2C), the query rewrite module 222 also generates a scoring query 120. A scoring query 120 is a query that the set processing module 228 uses to score the records in the consideration set. In some implementations, the set processing module 228 uses the retrieval query 118 to score the records in the consideration set instead of generating a scoring query 120.

Figure 4A:
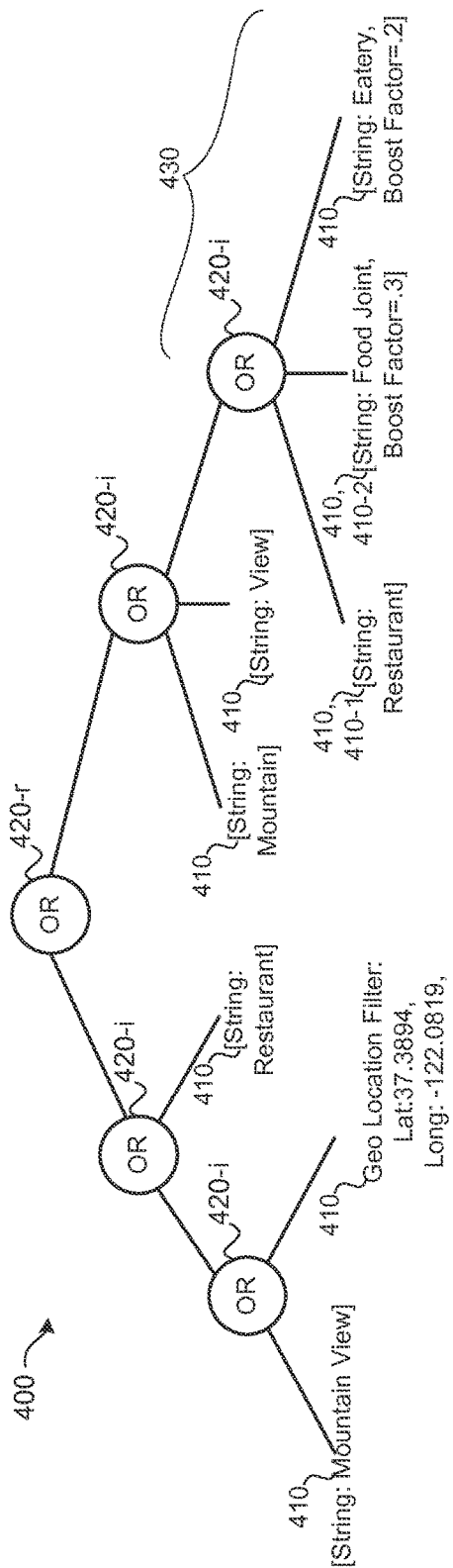

In some implementations, the retrieval query 118 is a tree structure. FIG. 4A illustrates an example of a retrieval query 118 in a tree structure 400. In the illustrated example, the leaf nodes 410 represent singular elements of the retrieval query 118 and the intermediate nodes 420-$i$ and the root node 420-*r* are logical operators. The query rewrite module 222 operates on each leaf node 310 of the intent query 116 individually. For each leaf node 310, the query rewrite module 222 generates a subtree 430 of the retrieval query based on the contents of the leaf node 310. The subtree 430 can include zero or more leaf nodes 410 depending on the contents of the leaf node 310 of the intent query 116. In most situations, the subtree 430 includes one or more leaf nodes 410. Under certain conditions, however, a subtree 430 can contain zero leaf nodes. For example, if a query term 104 is not a defined stop word, but in the query 102 the term 104 is used as a modifier or to provide context of another term (e.g., "near" in the search query "restaurants near mountain view,"), the query rewrite module 222 may decide to disregard the term 104 and does not generate any leaf nodes 410 corresponding to the term 104.

In some implementations, the query rewrite module 222 determines whether the leaf node 310 contains any properties 116. If the leaf node 310 does not contain any properties, the query rewrite module 222 creates a new leaf node 410 of the retrieval query 118 and copies the contents of the leaf node 310 of the intent query 116 into the new leaf node 410 of the retrieval query 118 tree structure 400. If the leaf node 310 does contain properties, the query rewrite module 222 separates the string portion of the leaf node 310 from the one or more properties of the leaf node 310. In operation, the query rewrite module 222 creates a new leaf node 410 and sets the value of its string equal to the value of the string of the leaf node 310 of the intent query 116. The query rewrite module 222 also creates an additional leaf node 410 for each one of the properties contained in the leaf node 310. Thus, if a leaf node 310 of an intent query 116 contained two properties 114, the query rewrite module 222 creates two additional leaf nodes 410, one for each property 114. In some implementations, the query rewrite module 222 maintains the same hierarchy of the intent query 116 in the retrieval query 118 for all nodes 420 above the leaf nodes 410. Put another way, the structures of the intent query 116 and the retrieval query 118 for all intermediate nodes 310-*i* and root nodes 310-*r* of the intent query 116 tree structure 300 are the same. Furthermore, the query rewrite module 222 can further substitute syntax from the leaf node 310 of the intent query with syntax that is to be included in the leaf node 410 of the retrieval query 118 (e.g., replace "type: location, value:" with "geolocation" and include longitude, latitude, and radius fields in the leaf node 410 or replace "confidence:" with "boost factor="). The query rewrite module 222 can utilize predetermined rules and/or a lookup table to determine the appropriate fields of the new leaf node 410 and how to substitute the values identified in the property to the fields of the new leaf node 410. Drawing from the example above, the query rewrite module 222 inserts the value "37.3984" into the "Lat" field, the value "−122.0819" into the "Long" field, and the value "10" into the radius field. The syntax that is used in the retrieval query 118 depends on the requirements of the backend search system 224. For example, a backend search system 224 may utilize the Apache Lucene information retrieval software library or the Elasticsearch information retrieval software library. In such instances, the syntax of the retrieval query 118 comports with the syntax of the information retrieval software library.

FIG. 4B illustrates an example retrieval query 118 that the query rewrite generation module 222 generates based on the example intent query 116 of FIG. 3B. The query rewrite generation module 222 generates the retrieval query 118 in the manner described with respect to FIG. 4A. As was discussed with respect to FIG. 4A, the query rewrite module 222 creates new leaf nodes 410 based on the leaf nodes 310 of the intent query 116 but otherwise maintains the same structure of the intent query 116 (i.e., the intermediate nodes 310-*i* and the root node 310-*r*).

Figure 4C:
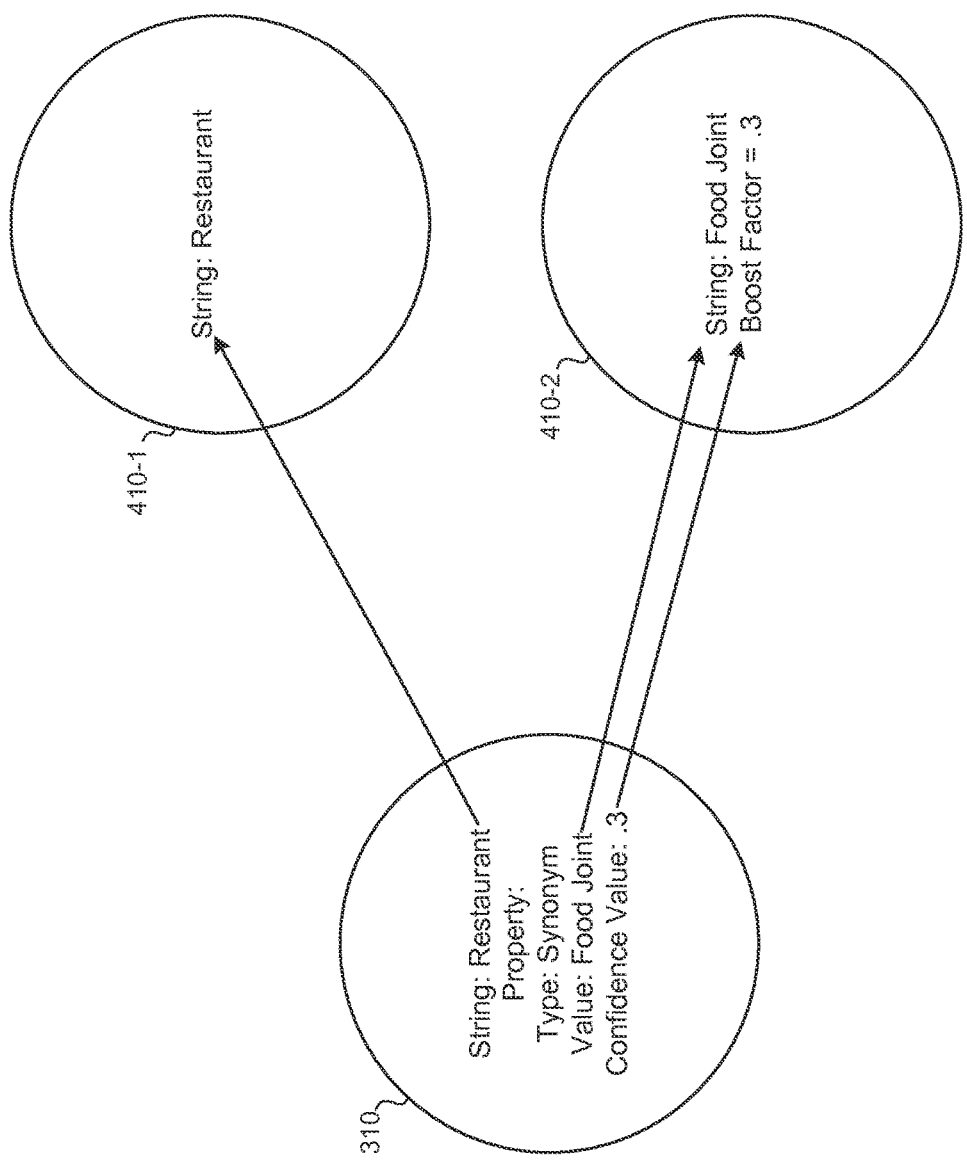
FIG. 4C is a schematic view illustrating an example of two retrieval query leaf nodes being generated from an intent query leaf node.

FIG. 4C illustrates an example of the query rewrite module 222 creating two leaf nodes 410 for a retrieval query based on a leaf node 310 of the intent query. In the illustrated example, the leaf node 310 of an intent query 116 contains the property: [type: synonym, value: food joint, confidence: 0.3]. In this example, the query rewrite module 222 analyzes the leaf node 310 and determines that the property is a synonym property. Based on either predetermined logic or a lookup table, the query rewrite module 222 determines that a synonym property is represented in a leaf node 410 using a string and potentially a boost factor (which are used to boost the retrieval score of a record in a consideration set). Further, the lookup table can indicate the proper syntax for strings and boosting factors (e.g. strings are identified using "string:" and boost factors are identified using "boost factor="). Thus, in the example above, the query rewrite module 222 can instantiate two leaf nodes 410-1, 410-2. In particular, the query rewrite module 222 can instantiate a first leaf node 410-1 and set the value of the string field thereof equal to "restaurant." The query rewrite module 222 can instantiate a second leaf node 410-2 and set the string field thereof equal to "food joint" and the boost factor field thereof equal to "0.3." As the second leaf node 410-2 represents an alternative representation of the first leaf node 410-1 (i.e. "food joint" is an alternate string for "restaurant"), the query rewrite module 222 connects the leaf nodes 410-1, 410-2 with an OR node (not shown). In some implementations, the absence of a boost factor in a leaf node 410 indicates that the boost factor is equal to one. Alternatively, query rewrite module 222 can set a boost factor of such a leaf node 410 equal to one. The query rewrite module 222 analyzes each leaf node 310 in the intent query 116 in the foregoing manner to generate the retrieval query.

In some implementations, the query rewrite module 222 outputs nested parenthesis strings instead of tree structures. In these implementations, the query rewrite module 222 can operate in the same manner but rather than creating nodes, the query rewrite module 222 creates statements and connects the statements with logical operators. For example, the query rewrite module 222 may receive the intent query 116 of FIG. 3A and output the following string: (([string: mountain view] OR [geolocation filter: lat: 7.3894, long: −122.0819, radius: 10 mi", boost factor=0.8]) OR [string: restaurant]) OR ([string: mountain] OR [string: view] OR ([string: restaurant] OR [string: food joint, boost factor=0.3] OR [string: eatery, boost factor=0.2]). In another example, the query rewrite module 222 may receive the intent query 116 of FIG. 3B and output the following string: ((([string: mountain view] OR [geolocation filter: lat: 7.3894, long: −122.0819, radius: 10 mi", boost factor=0.8]) OR [string: restaurant]) OR ([string: mountain] AND [string: view])) AND ([string: restaurant] OR [string: food joint, boost factor=0.3] OR [string: eatery, boost factor=0.2])).

In some implementations the query rewrite module 222 also generates a scoring query 120. The query rewrite module 222 can generate a scoring query 120 in the same manner as the retrieval query 118. The query rewrite module 222, however, includes leaf nodes 410 for stop words that were removed from the query. Further, the query rewrite module 222 can include leaf nodes 410 for terms that were repeated in the search query. For example, if a search query included the terms "restaurant reviews of Merv's restaurant"

the query rewrite module 222 includes leaf nodes 410 for both instances of the term "restaurant" in the scoring query 120.

The backend search system 224 receives a retrieval query 118, and in some implementations, a scoring query 120. The backend search system 224 generates search results 130 based on the retrieval query 118, and in some implementations, the scoring query 120. As previously discussed, the backend search system includes a set generation module 226 and set processing module 228. The backend search system 224 performs searches on a datastore 242 using the retrieval query 118.

In some implementations, the datastore 242 includes a plurality of different state records 500. Each state record may include data related to a function of an application and/or the state of the application resulting from performance of the function. A state record may include a function identifier (ID), application state information, and one or more access mechanisms used to access functionality or a state of an application. The datastore 242 may include one or more databases, indices (e.g., inverted indices), tables, files, or other data structures which may be used to implement the techniques of the present disclosure.

Figure 5:
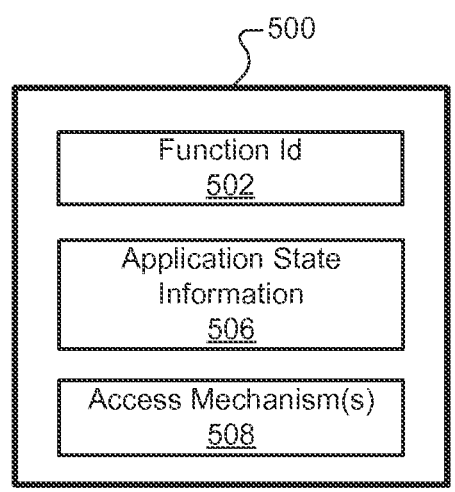
FIG. 5 is a schematic view illustrating an example of a state record.

Referring now to FIG. 5, an example state record 500 can include a function identifier 502 (hereinafter "function ID 502"), application state information 506, and one or more access mechanisms 508. The state record 500 may include data related to a function of an application and/or the state of the application resulting from performance of the function. The datastore 242 may include a plurality of state records having a similar structure as the state record 500. Put another way, the datastore 242 may include a plurality of state records 500 having a function ID 502, application state information 506, and one or more access mechanisms 508 (e.g., one or more application access mechanisms, one or more web access mechanisms, and one or more application download addresses.

The function ID 502 may be used to identify the state record 500 among the other state records 500 included in the datastore 242. The function ID 502 may be a string of alphabetic, numeric, and/or symbolic characters (e.g., punctuation marks) that uniquely identify the state record 500 in which the function ID 502 is included. In some examples, the function ID 502 may describe a function and/or an application state in human readable form. For example, the function ID 502 may include the name of the application referenced in the access mechanism(s) 508. Additionally, or alternatively, the function ID 502 may be a human readable string that describes a function performed according to the access mechanism(s) 508 and/or an application state resulting from performance of the function according to the access mechanism(s) 508. In some examples, the function ID 502 may include a string in the format of a uniform resource locator (URL) of a web access mechanism for the state record 500, which may uniquely identify the state record. For example, the function ID 502 may include a URL using a namespace other than "http://," such as "func://," which may indicate that the URL is being used as a function ID in a state record. For example, the function ID 502 may include the following string "func://www.yelp.combiz/the-french-laundry-yountville-2?ob=1."

In the illustrated example, the state record 500 includes one or more access mechanisms 508. The user device 100 may use the one or more application access mechanisms 508 and the one or more web access mechanisms to access the same, or similar, functionality of the native/web application referenced in the application state information. For example, the user device 100 may use the different access mechanism(s) 508 to retrieve similar information, play the same song, or play the same movie. The application download addresses may indicate locations where the native applications referenced in the application access mechanisms 508 can be downloaded.

The application state information 506 may include data that describes an application state into which an application is set according to the access mechanism(s) 508 in the state record 500. Additionally, or alternatively, the application state information 506 may include data that describes the function performed according to the access mechanism(s) 508 included in the state record 500. The application state information 506 may include a variety of different types of data. For example, the application state information 506 may include structured, semi-structured, and/or unstructured data. The search engine 200 may collect, extract, and/or infer the application state information 506 from documents retrieved from remote data sources, such as digital distribution platforms, application descriptions, blogs, application reviews, or other sources that can be accessed via the network 150. Additionally, or alternatively, the application state information 506 may be manually generated data. The search engine 200 may update the application state information 506 in any state record 500 so that up-to-date search results 130 can be provided in response to a search query 102.

In some examples, the application state information 506 may include data that may be presented to the user by an application when the application is set in the application state defined by the access mechanism(s) 508. For example, if one of the access mechanism(s) 508 is an application access mechanism, the application state information 506 may include data that describes a state of the native application after the user device 100 has performed the one or more operations indicated in the application access mechanism. In one example, if the state record 500 is associated with a shopping application, the application state information 506 may include data that describes products (e.g., names and prices) that are shown when the shopping application is set to the application state defined by the access mechanism(s) 508. As another example, if the state record 500 is associated with a music player application, the application state information 506 may include data that describes a song (e.g., name and artist) that is played when the music player application is set to the application state defined by the access mechanism(s) 508.

The types of data included in the application state information 506 may depend on the type of information associated with the application state and the functionality defined by the access mechanism(s) 508. In one example, if the state record 500 is for an application that provides reviews of restaurants, the application state information 506 may include information (e.g., text and numbers) related to a restaurant, such as a category of the restaurant, reviews of the restaurant, and a menu for the restaurant. In this example, the access mechanism(s) 508 may cause the application (e.g., a web or native application) to launch and retrieve information for the restaurant (e.g., using a web browser application or one of the native applications installed on the user device 100). As another example, if the state record 500 is for an application that plays music, the application state information 506 may include information related to a song, such as the name of the song, the artist, lyrics, and listener reviews. In this example, the access mechanism(s) 508 may cause the application to launch and play the song described in the application state information 506. In some implementations, an application access mechanism 508 can include one or more instructions for accessing a function or state of an application (e.g., a script). In such implementations, the instructions can be used to access states of native applications that are not accessible by an application resource identifier. In particular, the instructions can cause at least one of a search application executing on the user device 100 or operating system of the user device 100 to launch the native application and perform operations to access a specific state or function of the native application.

The set generation module 226 receives the retrieval query 118 from the query rewrite module 222 and identifies a plurality of state records 500 based on the retrieval query 118. In some examples, the set generation module 226 may identify the state records based on matches between the contents of the leaf nodes 410 (FIGS. 4A and 4B) or nested statements of the retrieval query 118 and terms in the state records 500. For example, the set generation module 226 may identify state records 500 that have application state data 506 that matches to one or more of the leaf nodes 410 of the retrieval query 118 or satisfies one or more conditions of the nested statements of the retrieval query 118. Depending on the logical operator nodes 420 of the retrieval query, the set generation module 226 may require the matching of more than one leaf nodes 410 (e.g., in the case of an "AND" node 420) to state record 500. In some implementations, the set generation module 226 also determines a retrieval score for each matched state record 500. The libraries discussed above include capabilities for determining retrieval scores. A retrieval score of a state record 500 is a value that is indicative of how well the state record 500 matches the retrieval query 118. If a leaf node contains a boosting factor, the retrieval score is further based on the boosting factor. For instance, if the string or value in a particular leaf node 410 matches to text or a value in a state record, the set generation module 226 can multiply the initial retrieval score by the boost factor defined in the particular leaf node 410.

The set generation module 226 can filter the identified state records 500 based on the retrieval score of the identified state records 500 to identify the consideration set of records. In some implementations, the set generation module 226 discards any state records 500 having a retrieval score below a retrieval score threshold (e.g., <0.4) and includes the remaining state records 500 in the consideration set. In other implementations, the set generation module 226 sorts the identified state records 500 and includes up to a certain number of state records 500 in the consideration set (e.g., up to 150 state records 500).

The set processing module 228 may score the state records in the consideration set in order to generate a set of search results 130. The scores associated with the state records may be referred to as "result scores." The set processing module 228 may determine a result score for each of the state records in the consideration set. The result scores associated with a state record may indicate the relative rank of the state record 500 (e.g., the access mechanisms) among other state records 500. For example, a larger result score may indicate that a state record 500 is more relevant to the received search query 102 than a state record 500 having a lesser result score.

The information conveyed by the search results 130 may depend on how the result scores are calculated by the set processing module 228. For example, the result scores may indicate the relevance of an application function or application state to the search query 102, the popularity of an application function or state, or other properties of the application function or state, depending on what parameters the set processing module 228 uses to score the state records.

The set processing module 228 may generate result scores for state records 500 in a variety of different manners. In some implementations, the set processing module 228 generates a result score for a state record 500 based on one or more scoring features. The scoring features may be associated with the state record 500 and/or the search query 102. A state record 500 scoring feature (hereinafter "record scoring feature") may be based on any data associated with a state record 500. For example, record scoring features may be based on any data included in the application state information 506 of the state record 500. Example record scoring features may be based on metrics associated with a person, place, or thing described in the state record 500. Example metrics may include the popularity of a place described in the state record 500 and/or ratings (e.g., user ratings) of the place described in the state record 500. In one example, if the state record 500 describes a song, a metric may be based on the popularity of the song described in the state record and/or ratings (e.g., user ratings) of the song described in the state record. The record scoring features may also be based on measurements associated with the state record 500, such as how often the state record 500 is retrieved during a search and how often access mechanisms of the state record 500 are selected by users. Record scoring features may also be based on whether the state record 500 includes an application access mechanism that leads to a default state or a deeper native application state.

A query scoring feature may include any data associated with the search query 102. For example, query scoring features may include, but are not limited to, a number of words in the search query 102, the popularity of the search query 102, and the expected frequency of the words in the search query 102. In some implementations, the query scoring features can also include the scoring query 120 (e.g., FIG. 2C). A record-query scoring feature may include any data generated based on data associated with both the state record and the search query 102 that resulted in identification of the state record by the set generation module 226. For example, record-query scoring features may include, but are not limited to, parameters that indicate how well the terms of the search query 102 match the terms of the application state information of the identified state record 500 (e.g., the retrieval score of the state record). The set processing module 228 may generate a result score for a state record based on any combination of the record scoring features, the query scoring features, and the record-query scoring features.

The set processing module 228 may determine a result score based on one or more of the scoring features listed herein and/or additional scoring features not explicitly listed. In some examples, the set processing module 228 may include one or more machine learned models (e.g., a supervised learning model) configured to receive one or more scoring features. The one or more machine learned models may generate result scores based on at least one of the record scoring features, the query scoring features, and the record-query scoring features. For example, the set processing module 228 may pair the search query 102 with each state record and calculate a vector of features for each (query, record) pair. The vector of features may include one or more record scoring features, one or more query scoring features, and one or more record-query scoring features. The set processing module 228 may then input the vector of features into a machine-learned regression model to calculate a result score for the state record. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores associated with the state records 500 (e.g., access mechanisms) may be used in a variety of different ways. The set processing module 228 can select state records to include in the search results 130. In particular, the set processing module 228 can rank the state records according to their respective result score and select the state records for inclusion in the search result based on the ranking. For example, the set processing module 228 can select the highest ranking state records up to a threshold (e.g., 25 records) or can select all state records 500 having a score above a threshold. For each selected state record 500, the set processing module 228 can generate a result object based on the contents of the state record 500. For example, the set processing module 228 can use a result object template and populate the template with the access mechanisms contained in the state record 500 and any other additional relevant data (e.g., function ID, a description, a logo, the result score, etc.). The set processing module 228 can then transmit the generated result objects (i.e., the search results 130) to the user device 100.

Referring now to FIG. 6, an example set of operations for a method 600 for performing a search is described. The method 600 may be applied to any search that utilizes a datastore 242 that stores records. For example, the method 600 may be applied to application searches, web searches, or application state searches. The method 600 is explained as being performed by the components of the search module 212. The method 600, however, may be executed by any suitable components of a search engine 200 without departing from the scope of the disclosure.

At 602, the query analysis module 216 receives a search query 102. In some implementations, the query analysis module 216 receives a query wrapper 101 that includes the search query 102 and may include one or more context parameters 105. At 604, the query analysis module 216 generates one or more analyzed tokens 106 based on the query terms 104 of the search query 102. The query analysis module 216 can remove stop words, stem, and/or tokenize the query terms 104 to obtain the analyzed tokens 106.

At 606, the query understanding module 214 inputs the analyzed tokens into a plurality of parsers 218. Each parser performs a different parsing operation and outputs a parsed query 108 that includes one or more parsed tokens 110. Each parsed token 110 can include a string 112 and zero or more properties 114. At 608, the query understanding module 214 obtains the parsed queries 108 from each parser 218. The query understanding module 214 provides the parsed queries 108 to the intent query generation module 220. At 610, the intent query generation module 220 generates an intent query 116 based on the parsed queries. As previously discussed, the intent query generation module 220 operates on each parsed query 108 individually and on each parsed token 110 within a parsed query 108 individually. The intent query generation module 220 can generate a nested data structure (e.g., a tree or nested parenthesis string) based on a set of predetermined rules. In some implementations, the input generation module 220 merges the properties of alternate analyzed tokens 106 into a single analyzed token 106 before generating the intent query 116.

At 612, the query rewrite module 222 generates a retrieval query 118 based on the intent query 116. As previously indicated, the query rewrite module 222 operates on the individual leaf nodes 310 of the intent query 116 to determine whether the leaf node 310 defines any properties. If so, the query rewrite module 222 generates a retrieval query leaf node 410 to contain the string in the intent query leaf node 310 and stores the string of the intent query leaf node 116 therein. Also, the query rewrite module 222 generates a retrieval query leaf node 410 for each property contained in the query rewrite module 222 and stores the property in the generated retrieval query leaf node 410. If the intent query leaf node 310 does not contain any properties, then the query rewrite module 222 generates a retrieval query leaf node 410 to contain the string in the intent query leaf node 310 and stores the string of the intent query leaf node 116 therein. When generating the retrieval query leaf nodes, the query rewrite module 222 uses syntax that is accepted by the backend search system 224. The query rewrite module 222 can maintain the higher level structure of the intent query 116 in the retrieval query 118. The query rewrite module 222 provides the retrieval query 118 to the backend search system 224. In some implementations, the query rewrite module 222 also generates a scoring query 120, which is also provided to the backend search system 224.

At 614, the set generation module 226 identifies a consideration set of records based on the retrieval query 118. In particular, the set generation module 226 identifies records that match to at least one of the retrieval query leaf nodes 410 and satisfy the logic operators defined in the higher level nodes 420 of the retrieval query 118. The set generation module 226 may also assign retrieval scores to each identified record. The retrieval scores may be adjusted by the boosting factors defined in the retrieval query leaf nodes 410.

At 616, the set processing module 228 determines a result score for each record in the consideration set. The set processing module 228 can input each record to one or more machine learned models. The one or more machine learned models may generate result scores based on at least one of the record scoring features, the query scoring features, and the record-query scoring features. In some implementations, the machine learned models further base the result score on the scoring query 120. For each record, the one or more machine learned models output a result score which is applied to the record.

At 618, the set processing module 228 generates the search results based on the scored records. The set processing module 228 can rank the scored records based on their respective result scores. The set processing module 228 can select the records on which the search results will be based upon. The set processing module 228 can select the records based on their respective result scores. For each selected record, the set processing module 228 can generate a result object using a template and include any relevant data (e.g., access mechanisms and link data) in the result object. At 620, the set processing module 228 provides the search results 130 (i.e., the result objects) to the user device 100. The user device 100 can receive the search results and can render and display the displayable search results.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, by a processing device, a search query from a remote device, wherein the search query includes one or more query terms;
generating, by the processing device, a collection of one or more analyzed tokens based on the search query, wherein the collection of one or more analyzed tokens indicates at least a subset of the one or more query terms;
analyzing, by the processing device, the collection of one or more analyzed tokens with a plurality of different parsers, wherein:
each parser of the plurality of different parsers is configured to (i) according to a parsing operation specific to the parser, parse at least one of (a) the collection of one or more analyzed tokens and (b) the search query and (ii) output parsed query that includes a list of one or more parsed tokens,
each of the parsed tokens includes a corresponding string, and
at least one parsed token of at least one of the parsed queries includes one or more properties of the corresponding string;
generating, by the processing device, a retrieval query based on the parsed queries output by the plurality of different parsers, wherein:
the retrieval query is a data structure that includes a plurality of retrieval leaf nodes, and
each retrieval leaf node of the plurality of retrieval leaf nodes stores at least one of (i) a property of a string from a respective one of the parsed tokens and (ii) the string from the respective one of the parsed tokens;
identifying, by the processing device, a consideration set of records based on the plurality of retrieval leaf nodes, wherein each record of the consideration set of records includes state data related to at least one of (i) a function of a corresponding application and (ii) a state of the corresponding application resulting from performing the function;
determining, by the processing device, for each record in the consideration set of records, a result score for the record, wherein the result score for the record is determined based on a matching between the retrieval leaf node and the state data of the record;
generating, by the processing device, search results based on a subset of the consideration set of records, wherein the subset is selected based on the result scores of the consideration set of records; and
providing, by the processing device, the search results to the remote device.

2. The method of claim 1, wherein:
at least one of the parsed tokens of at least one of the parsed queries includes a confidence value; and
the confidence value indicates a level of confidence of a property of the string determined by the parser that generated the parsed token.

3. The method of claim 1, wherein generating the retrieval query based on the parsed queries comprises:
generating an intent query based on the parsed queries, wherein:
the intent query is a tree data structure that includes a plurality of connected intent query nodes, and
the plurality of connected intent query nodes includes one or more intent query leaf nodes that each store a respective one of the parsed tokens; and
generating the retrieval query based on the intent query.

4. The method of claim 3, wherein generating the retrieval query based on the intent query comprises:
for each intent query leaf node, generating a subtree of the retrieval query based on the intent query leaf node; and
connecting the generated subtrees of the retrieval query using higher level intermediate nodes, the higher level intermediate nodes each storing a logic operator.

5. The method of claim 4, wherein generating the subtree for the intent query leaf node comprises:
determining whether the parsed token stored in the intent query leaf node includes one or more properties in addition to the string of the parsed token;
in response to the parsed token in the intent query leaf node including one or more properties:
creating a string retrieval leaf node;

storing the string of the parsed token in the string retrieval leaf node;
for each property in the parsed token stored in the intent query leaf node:
creating a property retrieval leaf node; and
storing the property of the parsed token in the property retrieval leaf node;
creating an intermediate level node to store a logic operator; and
connecting the string retrieval leaf node and each of the property retrieval leaf nodes with the intermediate level node; and
in response to the parsed token in the intent query leaf node not including one or more properties:
creating a string retrieval leaf node; and
storing the string of the parsed token in the string retrieval leaf node.

6. The method of claim 3 further comprising:
generating a scoring query based on the intent query and the search query, wherein the scoring query is nested data structure, and
determining the result scores of each record in the consideration set based on the scoring query.

7. The method of claim 1, wherein, for each record of the consideration set of records, the state data stores one or more access mechanisms to access the functionality or the state of the application.

8. The method of claim 1, wherein the plurality of different parsers includes a location parser that outputs location parsed tokens and a synonym parser that outputs synonym parsed tokens.

9. The method of claim 8, wherein:
the location parsed tokens include a string identifying a known geographic location and one or more properties of the string, and
each property includes geographic coordinates corresponding to the geographic location and a confidence value that indicates a degree of likelihood that the analyzed tokens analyzed by the location parser are describing the known geographic location.

10. The method of claim 8, wherein:
the synonym parsed tokens include a string defining one or more strings defined in the analyzed tokens and one or more properties, and
the one or more properties define a synonym of the string and a confidence value that indicates a degree of likelihood that the synonym is an acceptable substitute for the string.

11. The method of claim 1 further comprising generating a subtree in the retrieval query for each parsed token that has a property, wherein generating the subtree in the retrieval query for a first parsed token includes:
creating an intermediate level node to store a logic operator;
creating a string retrieval leaf node;
storing the corresponding string of the first parsed token in the string retrieval leaf node;
connecting the string retrieval leaf node with the intermediate level node; and
for each property in the first parsed token:
creating a property retrieval leaf node;
storing the property in the property retrieval leaf node; and
connecting the property retrieval leaf node with the intermediate level node.

12. A search engine comprising:
a storage device that stores a datastore, the datastore storing a plurality of records, wherein each record includes state data related to at least one of (i) a function of a corresponding application and (ii) a state of the corresponding application resulting from performing the function;
a processing device that executes computer readable instructions, the computer readable instructions, when executed by the processing device, causing the processing device to:
receive a search query from a remote device, wherein the search query includes one or more query terms;
generate a collection of one or more analyzed tokens based on the search query, wherein the collection of one or more analyzed tokens indicates at least a subset of the one or more query terms;
analyze the collection of one or more analyzed tokens with a plurality of different parsers, wherein:
each parser of the plurality of different parsers is configured to (i) according to a parsing operation specific to the parser, parse at least one of (a) the collection of one or more analyzed tokens and (b) the search query and (iii) output parsed query that includes a list of one or more parsed tokens,
each of the parsed tokens include a corresponding string, and
at least one parsed token of at least one of the parsed queries includes one or more properties of the corresponding string;
generate a retrieval query based on the parsed queries output by the plurality of different parsers, wherein:
the retrieval query is a data structure that includes a plurality of retrieval leaf nodes, and
each leaf node of the plurality of retrieval leaf nodes stores at least one of (i) a property of a string from a respective one of the parsed tokens and (ii) the string from the respective one of the parsed tokens;
identify a consideration set of records based on the plurality of retrieval leaf nodes;
determine, for each record in the consideration set of records, a result score for the record, wherein the result score for the record is determined based on a matching between the retrieval leaf node and the state data of the record;
generate search results based on a subset of the consideration set of records, wherein the subset is selected based on the result scores of the consideration set of records; and
provide the search results to the remote device.

13. The search engine of claim 12, wherein:
at least one of the parsed tokens of at least one of the parsed queries includes a confidence value; and
the confidence value indicates a level of confidence of a property of the string determined by the parser that generated the parsed token.

14. The search engine of claim 12, wherein generating the retrieval query based on the parsed queries comprises:
generating an intent query based on the parsed queries, wherein:
the intent query is a tree data structure that includes a plurality of connected intent query nodes, and
the plurality of connected intent query nodes includes one or more intent query leaf nodes that each store a respective one of the parsed tokens; and
generating the retrieval query based on the intent query.

15. The search engine of claim 14, wherein generating the retrieval query based on the intent query comprises:
  for each intent query leaf node, generating a subtree of the retrieval query based on the intent query leaf node; and
  connecting the generated subtrees of the retrieval query using higher level intermediate nodes, the higher level intermediate nodes each storing a logic operator.

16. The search engine of claim 15, wherein generating the subtree for the intent query leaf node comprises:
  determining whether the parsed token stored in the intent query leaf node includes one or more properties in addition to the string of the parsed token;
  in response to the parsed token in the intent query leaf node including one or more properties:
    creating a string retrieval leaf node;
    storing the string of the parsed token in the string retrieval leaf node;
    for each property in the parsed token stored in the intent query leaf node:
      creating a property retrieval leaf node; and
      storing the property of the parsed token in the property retrieval leaf node;
    creating an intermediate level node to store a logic operator; and
    connecting the string retrieval leaf node and each of the property retrieval leaf nodes with the intermediate level node; and
  in response to the parsed token in the intent query leaf node not including one or more properties:
    creating a string retrieval leaf node; and
  storing the string of the parsed token in the string re retrieval leaf node.

17. The search engine of claim 14, wherein the computer readable instructions further cause the processing device to:
  generate a scoring query based on the intent query and the search query, wherein the scoring query is a nested data structure, and
  determine the result scores of each record in the consideration set based on the scoring query.

18. The search engine of claim 12, wherein, for each record of the consideration set of records, the state data stores one or more access mechanisms to access the functionality or the state of the application.

19. The search engine of claim 12, wherein the plurality of different parsers includes a location parser that outputs location parsed tokens and a synonym parser that outputs synonym parsed tokens.

20. The search engine of claim 19, wherein:
  the location parsed tokens include a string identifying a known geographic location and one or more properties of the string, and
  each property includes geographic coordinates corresponding to the geographic location and a confidence value that indicates a degree of likelihood that the analyzed tokens analyzed by the location parser are describing the known geographic location.

21. The search engine of claim 20, wherein:
  the synonym parsed tokens include a string defining one or more strings defined in the analyzed tokens and one or more properties, and
  the one or more properties define a synonym of the string and a confidence value that indicates a degree of likelihood that the synonym is an acceptable substitute for the string.

22. The search engine of claim 12, wherein the processing device is further configured to generate a subtree in the retrieval query for each parsed token that has a property, wherein generating the subtree in the retrieval query for a first parsed token includes:
  creating an intermediate level node to store a logic operator;
  creating a string retrieval leaf node;
  storing the corresponding string of the first parsed token in the string retrieval leaf node;
  connecting the string retrieval leaf node with the intermediate level node;
  connecting the intermediate level node with one of a plurality of retrieval query nodes; and
  for each property in the first parsed token:
    creating a property retrieval leaf node;
    storing the property in the property retrieval leaf node; and
    connecting the property retrieval leaf node with the intermediate level node.

* * * * *